US010984248B2

(12) United States Patent
Shimauchi et al.

(10) Patent No.: US 10,984,248 B2
(45) Date of Patent: Apr. 20, 2021

(54) SETTING OF INPUT IMAGES BASED ON INPUT MUSIC

(71) Applicant: SONY CORPORATION, Tokyo (JP)

(72) Inventors: Kazuhiro Shimauchi, Tokyo (JP); Hiroshi Ikeda, Tokyo (JP); Nobuho Ikeda, Kanagawa (JP); Atsushi Kimura, Tokyo (JP)

(73) Assignee: SONY CORPORATION, Tokyo (JP)

(*) Notice: Subject to any disclaimer, the term of this patent is extended or adjusted under 35 U.S.C. 154(b) by 53 days.

(21) Appl. No.: 15/531,724

(22) PCT Filed: Oct. 28, 2015

(86) PCT No.: PCT/JP2015/080315
§ 371 (c)(1),
(2) Date: May 30, 2017

(87) PCT Pub. No.: WO2016/098458
PCT Pub. Date: Jun. 23, 2016

(65) Prior Publication Data
US 2017/0337428 A1    Nov. 23, 2017

(30) Foreign Application Priority Data
Dec. 15, 2014 (JP) .............................. JP2014-253213

(51) Int. Cl.
*G06K 9/00* (2006.01)
*H04N 5/91* (2006.01)
(Continued)

(52) U.S. Cl.
CPC ....... *G06K 9/00751* (2013.01); *G06K 9/4604* (2013.01); *G11B 20/10* (2013.01);
(Continued)

(58) Field of Classification Search
CPC .. G11B 27/28; G11B 27/031; G06K 9/00221; G06K 9/00751; G06K 9/4604; G06F 16/739; H04N 5/91
See application file for complete search history.

(56) References Cited

U.S. PATENT DOCUMENTS 6,535,639 B1 * 3/2003 Uchihachi ......... G06F 17/30799
341/79
6,557,042 B1 * 4/2003 He .................... G06F 17/30017
707/999.001
(Continued)

FOREIGN PATENT DOCUMENTS

EP       2116970 A1    11/2009
JP      11-069290 A     3/1999
(Continued)

OTHER PUBLICATIONS

Yoda et al., Machine generated translation of JP 2005-328516 A, Nov. 24, 2005. (Year: 2005).*
(Continued)

*Primary Examiner* — David E Harvey
(74) *Attorney, Agent, or Firm* — Chip Law Group

(57) ABSTRACT

An information processing apparatus includes one or more processors configured to analyze content of a plurality of input images, extract one or more unit images from the plurality of input images based on the analysis and set a position of each of the one or more unit images adopted in a summary image based on an input music.

16 Claims, 14 Drawing Sheets

(51) Int. Cl.
    *G11B 20/10* (2006.01)
    *G11B 27/28* (2006.01)
    *G06K 9/46* (2006.01)
    *G11B 27/031* (2006.01)

(52) U.S. Cl.
    CPC ............ *G11B 27/031* (2013.01); *G11B 27/28* (2013.01); *H04N 5/91* (2013.01)

(56) References Cited

U.S. PATENT DOCUMENTS

| | | | | |
|---|---|---|---|---|
| 6,686,970 B1* | 2/2004 | Windle | ............... | H04N 1/00183 348/584 |
| 7,065,250 B1* | 6/2006 | Lennon | ................... | G06K 9/469 382/224 |
| 7,068,723 B2* | 6/2006 | Foote | ................... | G11B 27/031 375/240.25 |
| 7,181,757 B1* | 2/2007 | Kim | ..................... | G11B 27/105 725/40 |
| 7,301,092 B1* | 11/2007 | McNally | ............... | G10H 1/368 84/612 |
| 7,383,509 B2* | 6/2008 | Foote | ....................... | G09B 5/00 704/E15.045 |
| 7,606,397 B2* | 10/2009 | Kowald | ............. | G06K 9/00221 345/619 |
| 7,796,860 B2* | 9/2010 | Peker | ................. | G06F 17/30787 375/240 |
| 8,180,826 B2* | 5/2012 | Hua | ................... | G06F 17/30793 709/201 |
| 8,196,045 B2* | 6/2012 | Chandratillake | ........ | G06F 16/78 715/719 |
| 8,416,332 B2* | 4/2013 | Sato | ......................... | G06T 11/60 348/333.05 |
| 8,879,788 B2* | 11/2014 | Yamamoto | ......... | G06K 9/00711 382/103 |
| 9,031,389 B2 | 5/2015 | Kashima | | |
| 9,111,519 B1* | 8/2015 | Yang | ........................ | G10H 1/40 |
| 9,706,113 B2* | 7/2017 | Nunomaki | ........... | G11B 27/034 |
| 9,747,949 B2* | 8/2017 | Lothian | .................. | G11B 27/10 |
| 9,818,451 B1* | 11/2017 | Tyagi | ..................... | G11B 27/34 |
| 2002/0093591 A1* | 7/2002 | Gong | ................ | G06F 17/30029 348/515 |
| 2002/0147834 A1* | 10/2002 | Liou | ....................... | H04L 29/06 709/236 |
| 2003/0025878 A1* | 2/2003 | Fredlund | .................. | G10H 1/40 352/1 |
| 2003/0085913 A1* | 5/2003 | Ahmad | ................... | G06F 16/40 715/730 |
| 2003/0160944 A1* | 8/2003 | Foote | ....................... | G03B 31/00 352/1 |
| 2004/0019608 A1* | 1/2004 | Obrador | ............... | G06F 16/489 |
| 2004/0052505 A1* | 3/2004 | Ahmad | ................... | G11B 27/034 386/202 |
| 2004/0088723 A1* | 5/2004 | Ma | ....................... | G06F 16/785 725/19 |
| 2004/0109674 A1* | 6/2004 | Ohmori | ............... | G11B 27/034 386/253 |
| 2004/0122539 A1* | 6/2004 | Ainsworth | ........... | H04N 9/8211 700/94 |
| 2005/0086703 A1* | 4/2005 | Gupta | ................... | G06F 17/241 725/135 |
| 2005/0182503 A1* | 8/2005 | Lin | ...................... | G11B 27/031 700/94 |
| 2005/0211072 A1* | 9/2005 | Lu | .......................... | G10H 1/40 84/612 |
| 2005/0229225 A1* | 10/2005 | Klausberger | .......... | G11B 27/034 725/112 |
| 2005/0232588 A1 | 10/2005 | Hosoda et al. | | |
| 2006/0078288 A1* | 4/2006 | Huang | ................. | G11B 27/034 386/231 |
| 2006/0095340 A1* | 5/2006 | Iadanza | ................. | G06Q 30/02 705/26.8 |
| 2006/0127054 A1* | 6/2006 | Matsuyama | ........ | H04N 1/00405 386/248 |
| 2006/0173918 A1* | 8/2006 | Nakase | ............. | G06F 17/30265 |
| 2006/0277098 A1* | 12/2006 | Chung | ................... | G06Q 30/02 705/14.22 |
| 2007/0047917 A1* | 3/2007 | Sasaki | ................. | G11B 27/322 386/230 |
| 2007/0061727 A1* | 3/2007 | Boregowda | ............ | H04N 5/147 715/723 |
| 2007/0074115 A1* | 3/2007 | Patten | .................. | G11B 27/032 715/716 |
| 2007/0094251 A1* | 4/2007 | Lu | ........................... | G06F 16/35 |
| 2007/0292106 A1* | 12/2007 | Finkelstein | ............ | G11B 27/28 386/241 |
| 2008/0097970 A1* | 4/2008 | Olstad | ............... | G06F 17/30796 |
| 2008/0155422 A1* | 6/2008 | Manico | ................. | G11B 27/031 715/731 |
| 2008/0159383 A1* | 7/2008 | Kukreja | ................. | G11B 27/34 375/240.01 |
| 2008/0209484 A1* | 8/2008 | Xu | ......................... | G10H 1/368 725/105 |
| 2008/0306995 A1* | 12/2008 | Newell | .............. | G06F 17/30265 |
| 2009/0080853 A1* | 3/2009 | Chen | ................ | G06F 17/30787 386/241 |
| 2009/0119591 A1* | 5/2009 | Chevallier | ........ | G06F 17/30817 715/716 |
| 2009/0144608 A1* | 6/2009 | Oisel | ................ | G06F 17/30828 715/230 |
| 2009/0150781 A1* | 6/2009 | Iampietro | .............. | G11B 27/10 715/716 |
| 2009/0204637 A1* | 8/2009 | Li | ........................ | G06F 17/3025 |
| 2010/0094441 A1 | 4/2010 | Mochizuki et al. | | |
| 2010/0215337 A1* | 8/2010 | Konishi | ............ | H04N 5/23293 386/343 |
| 2010/0239225 A1* | 9/2010 | Nakama | ................. | H04N 5/783 386/343 |
| 2010/0272187 A1* | 10/2010 | Civanlar | .............. | G11B 27/105 375/240.25 |
| 2011/0026901 A1 | 2/2011 | Kashima | | |
| 2011/0063440 A1* | 3/2011 | Neustaedter | ........... | H04N 5/144 348/143 |
| 2011/0122137 A1* | 5/2011 | Wang | ................... | G06T 11/206 345/440 |
| 2011/0137910 A1* | 6/2011 | Hibino | ............... | G06F 17/30247 707/741 |
| 2011/0205399 A1* | 8/2011 | Gao | ........................ | G11B 27/034 348/231.99 |
| 2011/0225196 A1* | 9/2011 | Haseyama | ........ | G06F 17/30781 707/780 |
| 2011/0264641 A1* | 10/2011 | Yang | ....................... | G06F 16/51 707/706 |
| 2011/0292245 A1* | 12/2011 | Deever | ............... | G11B 27/034 348/231.2 |
| 2012/0033949 A1* | 2/2012 | Lu | ........................ | G11B 27/034 386/285 |
| 2012/0079380 A1* | 3/2012 | Tsai | .................. | G06F 17/30017 715/716 |
| 2012/0092515 A1* | 4/2012 | Yim | ................... | H04N 5/23222 348/222.1 |
| 2012/0127196 A1* | 5/2012 | Landry | .................. | G06F 3/147 345/619 |
| 2012/0242844 A1* | 9/2012 | Walker | ............... | G11B 27/3027 348/207.1 |
| 2013/0230293 A1* | 9/2013 | Boyle | .................. | H04N 5/2251 386/224 |
| 2013/0279881 A1* | 10/2013 | Lu | ...................... | G06K 9/00751 386/241 |
| 2013/0283136 A1* | 10/2013 | Weber | .................. | G06F 40/106 715/202 |
| 2013/0330062 A1* | 12/2013 | Meikle | ..................... | H04N 9/87 386/285 |
| 2013/0336590 A1* | 12/2013 | Sentinelli | ............... | H04N 5/772 382/218 |
| 2013/0343729 A1* | 12/2013 | Rav-Acha | .............. | G11B 27/28 386/285 |

(56) References Cited

U.S. PATENT DOCUMENTS

| | | | |
|---|---|---|---|
| 2014/0036088 A1* | 2/2014 | Gabriel | H04N 1/00137 348/157 |
| 2014/0037269 A1* | 2/2014 | Kumar | G06K 9/00765 386/286 |
| 2014/0096002 A1* | 4/2014 | Dey | G06F 3/0488 715/723 |
| 2014/0201126 A1* | 7/2014 | Zadeh | G06N 7/005 706/52 |
| 2014/0219628 A1* | 8/2014 | Miner | H04N 5/77 386/227 |
| 2014/0282642 A1* | 9/2014 | Needham | H04N 21/44218 725/10 |
| 2014/0317480 A1* | 10/2014 | Chau | G11B 27/036 715/202 |
| 2014/0320697 A1* | 10/2014 | Lammers | H04N 5/76 348/231.99 |
| 2014/0334796 A1* | 11/2014 | Galant | G11B 27/28 386/241 |
| 2015/0058709 A1* | 2/2015 | Zaletel | G06F 16/252 715/202 |
| 2015/0155007 A1* | 6/2015 | Barfield, Jr. | G06T 17/05 386/278 |
| 2015/0228310 A1* | 8/2015 | Lothian | G11B 27/10 386/285 |
| 2015/0243326 A1* | 8/2015 | Pacurariu | G11B 27/031 386/280 |
| 2015/0363409 A1* | 12/2015 | Wood | G06F 16/44 707/738 |
| 2015/0373281 A1* | 12/2015 | White | G11B 27/002 348/660 |
| 2016/0026874 A1* | 1/2016 | Hodulik | H04N 5/232 386/281 |
| 2016/0029105 A1* | 1/2016 | Newman | H04N 5/77 386/281 |
| 2016/0071549 A1* | 3/2016 | von Sneidern | G11B 27/031 386/241 |
| 2016/0092561 A1* | 3/2016 | Liu | G06F 16/739 386/230 |
| 2016/0105734 A1* | 4/2016 | Packard | H04N 21/25841 725/32 |
| 2016/0133295 A1* | 5/2016 | Boyle | G06K 9/00744 386/240 |
| 2016/0142794 A1* | 5/2016 | Yoo | G11B 27/036 386/282 |
| 2016/0217828 A1* | 7/2016 | Rav-Acha | G11B 27/036 |
| 2016/0224834 A1* | 8/2016 | Adsumilli | H04N 19/513 |
| 2016/0372096 A1* | 12/2016 | Lyske | G10H 1/40 |
| 2017/0148488 A1* | 5/2017 | Li | G11B 27/034 |
| 2017/0194034 A1* | 7/2017 | Onozawa | G06K 9/00758 |

FOREIGN PATENT DOCUMENTS

| | | | |
|---|---|---|---|
| JP | 11-136637 A | | 5/1999 |
| JP | 2003-259302 A | | 9/2003 |
| JP | 2005-175630 A | | 6/2005 |
| JP | 2005-277531 A | | 10/2005 |
| JP | 2005328516 A | * | 11/2005 |
| JP | 2006-014084 A | | 1/2006 |
| JP | 2007-335984 A | | 12/2007 |
| JP | 2008-312215 A | | 12/2008 |
| JP | 2009-080794 A | | 4/2009 |
| JP | 2011-030159 | | 2/2011 |
| JP | 2011-030159 A | | 2/2011 |
| WO | 2009/031402 A1 | | 3/2009 |
| WO | WO-2013076720 A1 | * | 5/2013 ........... H04N 9/8205 |

OTHER PUBLICATIONS

International Search Report and Written Opinion of PCT Application No. PCT/JP2015/080315, dated Dec. 15, 2015, 2 pages of English Translation and 7 pages of ISRWO.

* cited by examiner

FIG. 7

| OPERATION MODE | IMAGE QUALITY | IMAGE ANALYSIS RESULT INFORMATION | MUSIC ANALYSIS RESULT INFORMATION | PROCESSING RESULT |
|---|---|---|---|---|
| NORMAL PROCESSING MODE | HIGH | USED | USED | SWITCHING TIMING / UNIT IMAGE (410, 420, 430) |
| SEGMENTATION PROCESSING MODE | MEDIUM | MODIFIED AND USED | USED | SWITCHING TIMING / UNIT IMAGE (411 412 421 422 423 431 432 433) |
| RETRY PROCESSING MODE | LOW | IGNORED | IGNORE | SWITCHING TIMING / UNIT IMAGE |

SETTING OF INPUT IMAGES BASED ON INPUT MUSIC

CROSS REFERENCE TO RELATED APPLICATIONS

This application is a U.S. National Phase of International Patent Application No. PCT/JP2015/080315 filed on Oct. 28, 2015, which claims priority benefit of Japanese Patent Application No. JP 2014-253213 filed in the Japan Patent Office on Dec. 15, 2014. Each of the above-referenced applications is hereby incorporated herein by reference in its entirety.

TECHNICAL FIELD

The present disclosure relates to an information processing method, an image processing apparatus, and a program.

BACKGROUND ART

Recently, types of cameras such as wearable cameras and action cameras have been widely used in fields such as sports. With such cameras, continuous image-capturing is performed for a long time in many cases and composition easily becomes monotonous and thus there is a case in which images (pictures, videos, or the like) that have been captured are difficult to enjoy in their original states. Accordingly, a technology is desired for generating a summary image obtained by abbreviating interesting points of images that have been captured.

Regarding such a technology, for example, technologies for selecting sections to be used in a summary image from among original images have been developed, as disclosed in the Patent Literatures 1, 2, 3 and 4 below. Specifically, Patent Literature 1 below discloses a technology for detecting noteworthy sections from original images.

CITATION LIST

Patent Literature

Patent Literature 1: JP 2008-312215A
Patent Literature 2: JP 2007-335984A
Patent Literature 3: JP 2006-14084A
Patent Literature 4: JP H11-136637A

DISCLOSURE OF INVENTION

Technical Problem

However, the technology disclosed in Patent Literature 1 above can perform only detection of noteworthy sections from original images. Accordingly, a summary image adopting detected sections in their original states was generated, for example. Therefore, the present disclosure proposes a novel and improved information processing method, an image processing apparatus and a program, which are able to set a section actually adopted in a summary image for each section extracted as a candidate for adoption in the summary image.

Solution to Problem

According to the present disclosure, there is provided an information processing method including: analyzing content of an input image; and setting a position of an adoption section that is adopted from the image on the basis of information on a section of music and scene information of the analyzed image.

Further, according to the present disclosure, there is provided an image processing apparatus including: an image analysis unit configured to analyze content of an input image; and an extraction unit configured to set a position of an adoption section that is adopted from the image on the basis of information on a section of music and scene information of the analyzed image.

Further, according to the present disclosure, there is provided a program for causing a computer to function as: an image analysis unit configured to analyze content of an input image; and an extraction unit configured to set a position of an adoption section that is adopted from the image on the basis of information on a section of music and scene information of the analyzed image.

Advantageous Effects of Invention

According to the present disclosure described above, it is possible to set a section actually adopted in a summary image for each section extracted as a candidate for adoption in the summary image. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 7 is an explanatory diagram of an example of operation modes of the image processing apparatus according to the present embodiment.

MODE(S) FOR CARRYING OUT THE INVENTION

Figure 1:
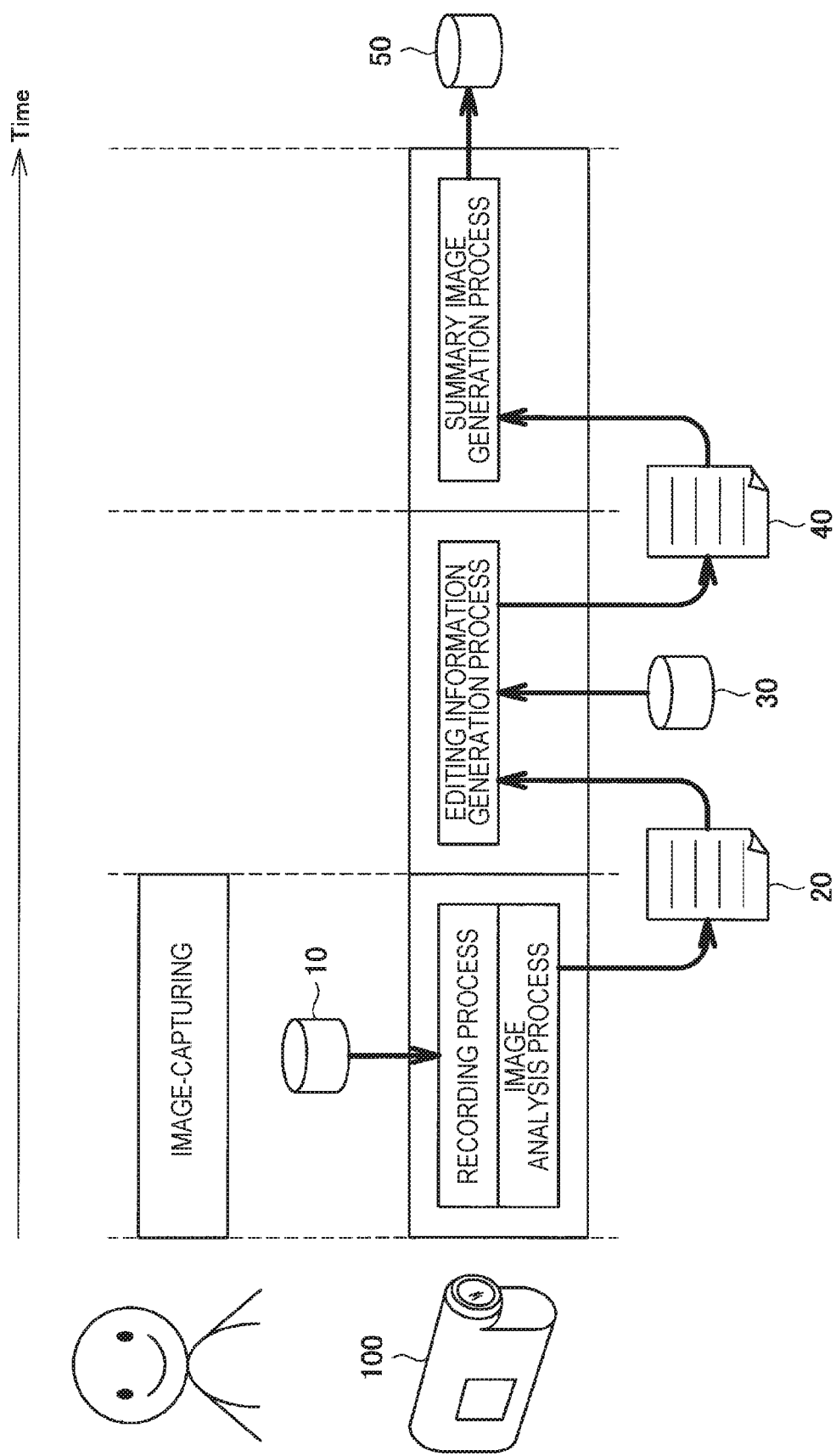
FIG. 1 is an explanatory diagram of an overview of an image processing apparatus according to the present embodiment.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Further, there is a case in which elements having substantially the same function are discriminated by affixing different alphabets to the back of the same sign in the present specification and figures. For example, elements having substantially the same functional configuration are discriminated as image processing apparatuses 100A, 100B and 100C as necessary. However, when there is no need to particularly discriminate a plurality of elements having substantially the same functional configuration, only the same sign is affixed. For example, when there is no need to particularly discriminate the image processing apparatuses 100A, 100B and 100C, they are simply referred to as an image processing apparatus 100.

Description will be performed in the following order.
1. Overview
2. Basic configuration
3. Details of functions
3.1. Unit image extraction process
3.2. Switching timing setting process
3.3. Operation mode decision process
3.4. Unit image selection process
3.5. Adoption section setting process
4. Operation processes
5. Example of hardware configuration
6. Conclusion

1. OVERVIEW

First of all, an overview of an image processing apparatus according to the present embodiment will be described with reference to FIGS. 1 to 3.

FIG. 1 is an explanatory diagram of the overview of the image processing apparatus 100 according to the present embodiment. In FIG. 1, an operation of a user using the image processing apparatus 100 and the progress of processes performed in the image processing apparatus 100 are illustrated and time flows from the left to the right. As illustrated in FIG. 1, the image processing apparatus 100 generates a summary image (picture, video, or the like) 50 from an image 10 captured by the user. The summary image 50 is an image of a digest obtained by summarizing the image captured by the user. The image processing apparatus 100 generates the summary image 50 by switching and connecting sections adopted from the image 10 that has been captured using any adoption standard depending on input music 30. Meanwhile, an image includes image (still image/moving image) data and sound data in the present specification. Hereinafter, an overview of a process of generating the summary image 50 executed in the image processing apparatus 100 will be described.

First of all, the image processing apparatus 100 simultaneously performs a recording process of recording the captured image 10 and an image analysis process of analyzing the image 10 in a period in which the user performs image-capturing. For example, the image processing apparatus 100 performs analysis of a user manipulation during image-capturing, performs image analysis such as smile detection, color detection and motion vector detection or performs analysis of a motion of a subject based on sensor information during image-capturing as the image analysis process.

Subsequently, the image processing apparatus 100 performs an editing information generation process on the basis of image analysis result information 20 indicating a result of the image analysis process and the input music 30. The image analysis result information 20 is information about a noteworthy event (section or period) to be specified or extracted as a highlight and, more specifically, an example of scene information representing a specific motion such as a jump or a turn, a smile or an exciting scene of an event that causes cheers. For example, the image processing apparatus 100 selects unit images to be adopted in the summary image 50 from the image 10 by evaluating the image analysis result information 20 using any adoption standards. The unit images are a series of images and are also called shots. In addition, the image processing apparatus 100 generates editing information 40 for switching adopted unit images depending on the music 30. The editing information 40 is information that specifies music 30, a section of the music 30 to be used as background music (BGM), a unit image to be switched and a timing at which the unit image will be switched. The image processing apparatus 100 generates the editing information 40 such that unit images are switched at a timing depending on the melody, rhythm, beat, liveliness or the like of the music 30 by analyzing the music 30 on the basis of music theory.

In addition, the image processing apparatus 100 performs a summary image generation process on the basis of the editing information 40. For example, the image processing apparatus 100 generates the summary image 50 by switching and connecting unit images designated by the editing information 40 at a designated timing using the music 30 designated by the editing information 40 as BGM. The image processing apparatus 100 may play the summary image 50, record the summary image 50 and transmit the summary image 50 to other apparatuses.

Further, the image analysis process illustrated in FIG. 1 may be performed in parallel with image-capturing by the user or performed after image-capturing. In addition, the image analysis process, the editing information generation process and the summary image generation process may be performed continuously or discontinuously. Furthermore, the image processing apparatus 100 may generate the summary image 50 using a plurality of images and music 30 as BGM.

The overview of the process of generating the summary image 50 has been described above. Subsequently, the process of generating the summary image 50 will be described in more detail with reference to FIGS. 2 and 3.

Figure 2:
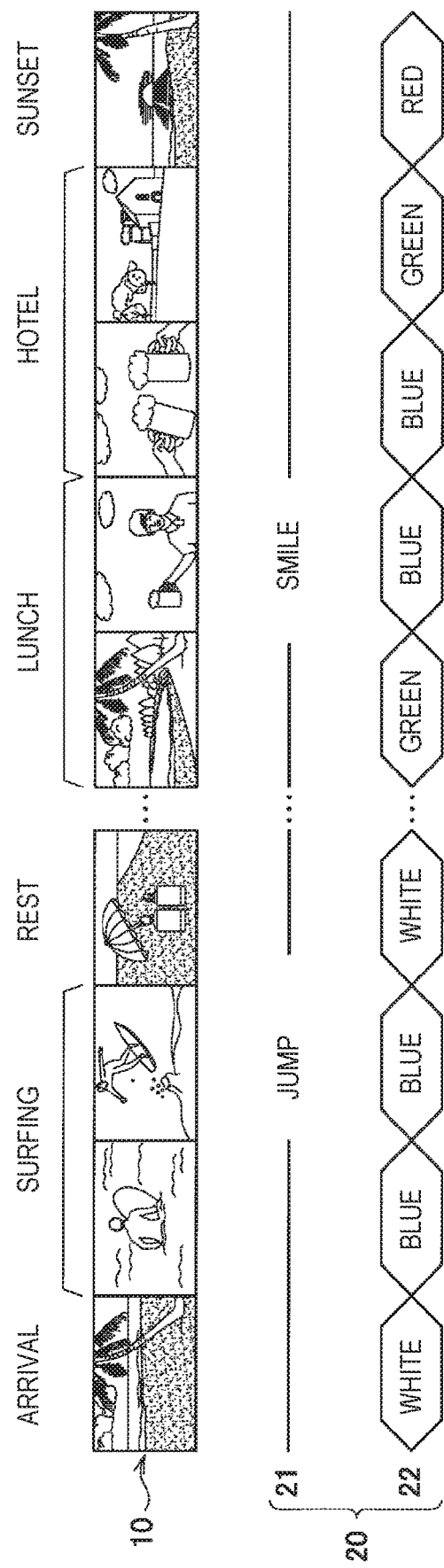
FIG. 2 is an explanatory diagram of an overview of an image analysis process executed in the image processing apparatus according to the present embodiment.

FIG. 2 is an explanatory diagram of an overview of the image analysis process executed in the image processing apparatus 100 according to the present embodiment. In the diagram illustrated in FIG. 2, images 10 are images of one day of the user and the image analysis result information 20 includes highlights 21 and scene segments 22 which are information representing attributes of the images. The images 10 include an image of arrival at a sea, an image of surfing, an image of a rest, an image of lunch, an image at a hotel and an image of sunset. The highlights 21 are sections representing interesting points in the images 10. For example, a specific motion such as a jump or a turn, a smile, an exciting scene of an event that causes cheers, an important scene in a specific event such as cake cutting or ring exchange in a wedding and the like may be considered as interesting points. The scene segments 22 are sections obtained by segmenting the images 10 under a predetermined condition. For example, the scene segment 22 may be a section in which the same color continues, segmented on the basis of colors. Further, the scene segment 22 may be a section in which the same camera work continues, segmented on the basis of camera work. In addition, the scene segment 22 may be a section captured on close dates and times, segmented on the basis of dates and times. Further, the scene segment 22 may be a section captured in the same place or close places, segmented on the basis of places. As an example, the scene segments 22 are segmented on the basis of colors in FIG. 2. Segmented colors may be white, blue, green and red, for example. The image processing apparatus analyzes the highlights 21 and the scene segments 22 corresponding to image attributes according to the image analysis process.

Figure 3:
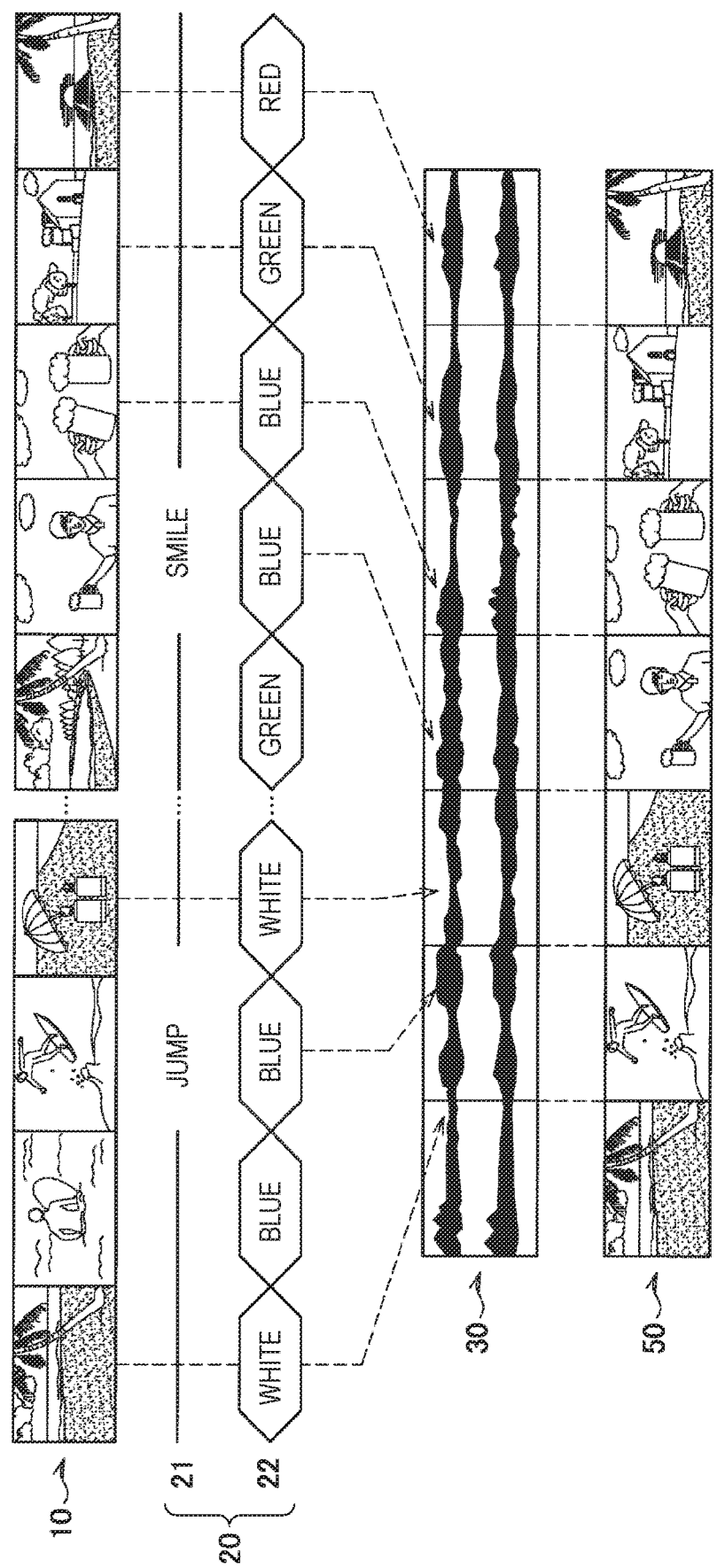
FIG. 3 is an explanatory diagram of an overview of an editing information generation process and a summary image generation process executed in the image processing apparatus according to the present embodiment.

FIG. 3 is an explanatory diagram of an overview of the editing information generation process and the summary image generation process executed in the image processing apparatus 100 according to the present embodiment. First of all, the image processing apparatus 100 extracts a series of images having the same scene segment 22 as unit images. Then, the image processing apparatus 100 adopts unit images in accordance with a predetermined policy while preferentially adopting the highlights 21 from among the unit images. For example, the image processing apparatus 100 may adopt unit images in which the scene segments 22 are distributed in order to reduce visual deviation. Furthermore, the image processing apparatus 100 may use unit images depending on a theme such as surfing or snowboarding designated by the user. Specifically, in the case of surfing, the image processing apparatus 100 may use unit images such that the proportion of highlights such as a turn during surfing rather than meals increases and the proportion of scene segments of blue, places close to the sea and a time in which waves are high increases. Further, the image processing apparatus 100 analyzes the music 30 (BGM) on the basis of music theory and sets a timing at which the unit images will be switched. Through such processes, the image processing apparatus 100 generates the editing information 40 for switching the adopted unit images at the set timing. Then, the image processing apparatus 100 generates the summary image 50 on the basis of the editing information 40. Further, the unit images included in the summary image 50 may be in a time series or not.

For example, the image processing apparatus 100 may be realized as a camera such as an action camera or a wearable camera. Cameras such as action cameras and wearable cameras continuously capture images for a long time in many cases and composition easily becomes monotonous. Accordingly, it is desirable that images captured by such cameras be edited into a summary image by integrating interesting points. However, such cameras are small and a UI is simple in many cases and thus there is a case in which it is difficult to manually edit images while confirming the images. Accordingly, it is desirable to generate an appropriate summary image for even images continuously captured for a long time and having a monotonous composition. In view of this, even in the case of such images, the image processing apparatus 100 according to the present embodiment may generate a summary image in which attributes are distributed and shots including highlights are switched depending on BGM in accordance with a theme designated by the user. Meanwhile, the image processing apparatus 100 may be realized as a general video camera or the like or an information processing apparatus such as a personal computer (PC) or a server on a network, separated from a camera.

The overview of the image processing apparatus 100 according to the present embodiment has been described above. Next, an example of a basic configuration of the image processing apparatus 100 according to the present embodiment will be described with reference to FIG. 4.

2. BASIC CONFIGURATION

Figure 4:
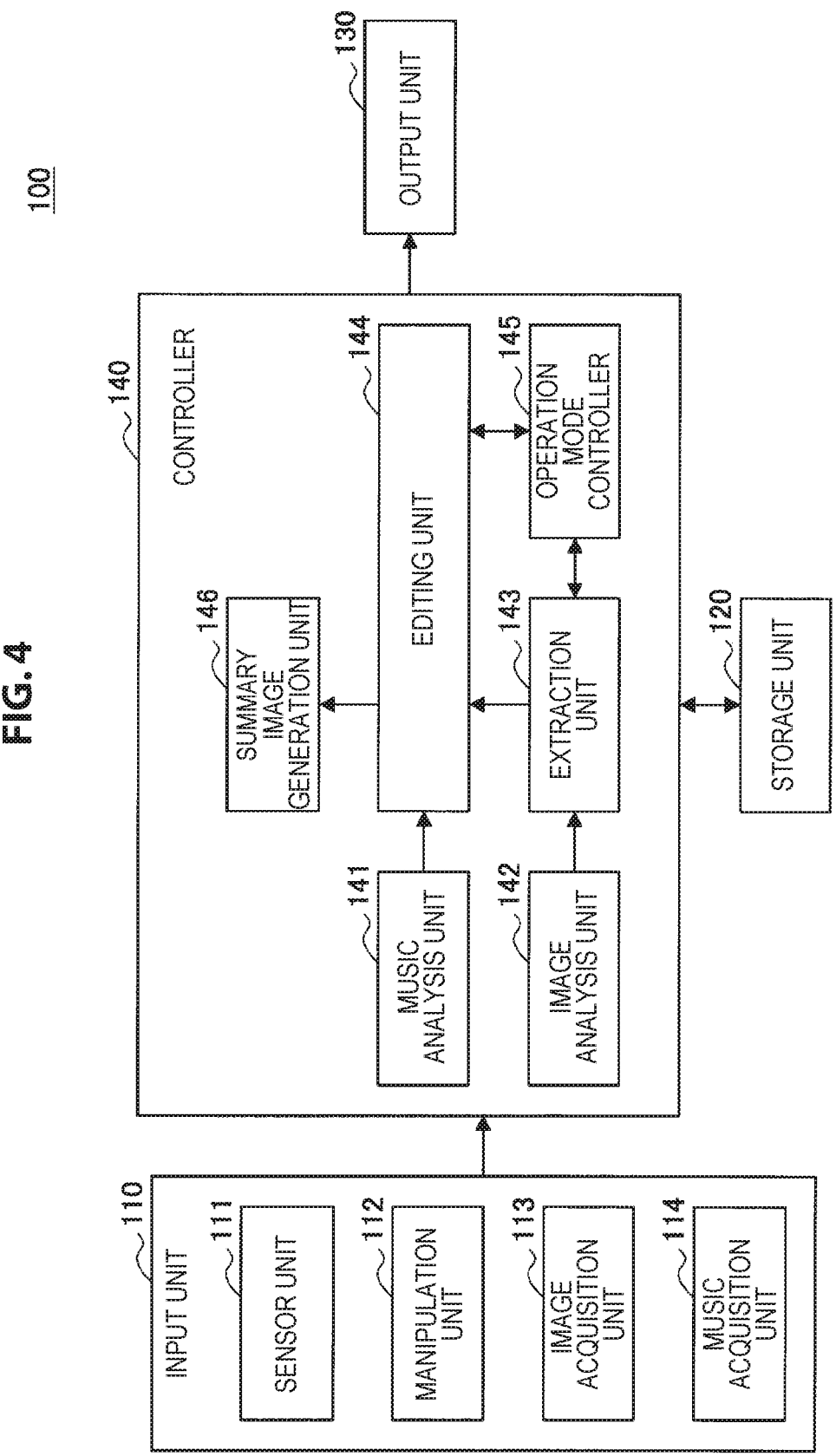
FIG. 4 is a block diagram illustrating an example of a logical configuration of the image processing apparatus according to the present embodiment.

FIG. 4 is a block diagram illustrating an example of a logical configuration of the image processing apparatus 100 according to the present embodiment. As illustrated in FIG. 4, the image processing apparatus 100 includes an input unit 110, a storage unit 120, an output unit 130 and a controller 140.

(1) Input Unit 110

The input unit 110 has a function of receiving input of various types of information from the outside. As illustrated in FIG. 4, the input unit 110 includes a sensor unit 111, a manipulation unit 112, an image acquisition unit 113 and a music acquisition unit 114.

(1.1) Sensor Unit 111

The sensor unit 111 has a function of detecting a motion of a subject. For example, the sensor unit 111 may include a gyro sensor, an acceleration sensor and a gravity sensor. The subject is an image-capturing target and also includes a person who captures images (user). The sensor unit 111 may include any sensor such as a global positioning system (GPS), an infrared sensor, a proximity sensor or a touch sensor. The sensor unit 111 outputs sensor information representing a sensing result to the controller 140. Further, the sensor unit 111 may not be integrated with the image processing apparatus 100. For example, the sensor unit 111 may acquire sensor information from a sensor attached to a subject through wired or wireless communication.

(1.2) Manipulation Unit 112

The manipulation unit 112 has a function of receiving a user manipulation. For example, the manipulation unit 112 is realized by a button, a touch pad and the like. The manipulation unit 112 may receive manipulations such as a zooming manipulation during image-capturing, a manipulation of setting an image-capturing mode and the like. As image-capturing modes, for example, a normal mode for capturing a moving image, a simultaneous image-capturing mode for simultaneously capturing a moving image and a still image and the like may be considered. In addition, the manipulation unit 112 may receive an editing instruction that designates sections to be included in a summary image during image-capturing or after image-capturing. The manipulation unit 112 outputs manipulation information representing the content of a user manipulation to the controller 140.

(1.3) Image Acquisition Unit 113

The image acquisition unit 113 has a function of acquiring images. For example, the image acquisition unit 113 is realized as an imaging device and outputs data of captured images (moving images/still images) corresponding to digital signals. The image acquisition unit 113 may further include a microphone for collecting surrounding sounds and converting the sounds into digital signals through an amplifier and an analog digital converter (ADC) to acquire sound data. In such a case, the image acquisition unit 113 outputs image data including surrounding sounds.

(1.4) Music Acquisition Unit 114

The music acquisition unit 114 has a function of acquiring music data that becomes BGM of a summary image. For example, the music acquisition unit 114 is realized as a wired or wireless interface and acquires music data from another apparatus such as a PC or a server. As a wired interface, for example, a connector conforming to a standard such as a universal serial bus (USB) may be considered. As a wireless interface, a communication apparatus conforming to a communication standard such as Bluetooth (registered trademark) or Wi-Fi (registered trademark) may be considered, for example. The music acquisition unit 114 outputs acquired music data to the controller 140.

(2) Storage Unit 120

The storage unit 120 has a function of storing various types of information. For example, the storage unit 120 stores information output from the input unit 110 and information generated by the controller 140.

(3) Output Unit 130

The output unit 130 has a function of outputting various types of information. For example, the output unit 130 may have a function of playing a summary image generated by a summary image generation unit 146 which will be described below. In such a case, the output unit 130 may include a display unit and a speaker. In addition, the output unit 130 may has a function of outputting editing information generated by an editing unit 144 which will be described below. In such a case, the output unit 130 may include a wired or wireless interface.

(4) Controller 140

The controller 140 serves as an arithmetic processing device and a control device and controls the overall operation in the image processing apparatus 100 according to various programs. As illustrated in FIG. 4, the controller 140 includes a music analysis unit 141, an image analysis unit 142, an extraction unit 143, the editing unit 144, an operation mode controller 145 and the summary image generation unit 146.

(4.1) Music Analysis Unit 141

The music analysis unit 141 has a function of analyzing the content of input music. Specifically, the music analysis unit 141 performs analysis based on music theory on music data acquired by the music acquisition unit 114.

The music analysis unit 141 may analyze a structure of music. For example, the music analysis unit 141 specifies a part that meets a predetermined condition by analyzing the structure of music. For example, the music analysis unit 141 may specify components such as an intro part, a melody (verse) part, a chorus (also called hook) part, an interlude part, a solo part and an outro part on the basis of music theory. The melody part may be divided into melody A and melody B. Furthermore, the music analysis unit 141 may detect chord progression in each specified component of the music and may specify a particularly important part (section) in the chorus part on the basis of detected chord signals. In addition, the music analysis unit 141 may specify a section in which a vocal starts to sing, a section in which the tone of the vocal is highest and the like in the chorus part as particularly important parts.

In addition, the music analysis unit 141 may analyze the rhythm of the music. For example, the music analysis unit 141 analyzes beats of the music and measures of the music. In the case of a quadruple time, for example, four beats are included at an equal interval in one measure and the first beat corresponds to the beginning of the measure. A beat corresponding to the beginning of a measure is referred to as a beat of a measure head in the following.

The music analysis unit 141 outputs music analysis result information representing an analysis result to the editing unit 144. Further, the music analysis result information (information on sections of music) includes information indicating the position of each component, the position of a particularly important part, the position of each beat and the position of each measure in music data.

(4.2) Image Analysis Unit 142

The image analysis unit 142 has a function of analyzing the content of an input image. Specifically, the image analysis unit 142 performs analysis of the content of image data acquired by the image acquisition unit 113. Then, the image analysis unit 142 outputs image analysis result information representing an image content analysis result to the extraction unit 143.

Detection of Highlight

For example, the image analysis unit 142 detects a highlight on the basis of information input through the input unit 110, includes information indicating the detected highlight in the image analysis result information and outputs the image analysis result information. As an example, an example in which the image analysis unit 142 detects highlights regarding a subject motion, a user manipulation, a face and a smile will be described.

For example, the image analysis unit 142 detects a predetermined motion of a subject on the basis of sensor information acquired by the sensor unit 111. For example, the image analysis unit 142 may detect a motion of the subject such as takeoff (jump), turn of a progress direction (turn), run, acceleration or deceleration of the subject on the basis of sensor information. In addition, the image analysis unit 142 may detect a predetermined motion of the subject by performing an image recognition process on image data acquired by the image acquisition unit 113. With respect to the process of detecting a subject motion, the image analysis result information may include information indicating the detected motion of the subject and information indicating a section in which the motion is detected in the image data.

For example, the image analysis unit 142 detects a user manipulation on the basis of manipulation information acquired by the manipulation unit 112. For example, the image analysis unit 142 detects a predetermined manipulation and the like such as a zooming manipulation and a manipulation of setting an image-capturing mode on the basis of manipulation information acquired during image-capturing. With respect to the process of detecting a user manipulation, the image analysis result information may include information indicating the detected user manipulation and information indicating a section in which the user manipulation is detected in the image data. In addition, the image analysis unit 142 detects an editing instruction on the basis of manipulation information acquired during image-capturing or after image-capturing. In this case, the image analysis result information may include information indicating a section designated as a section to be included in a summary image by the user.

For example, the image analysis unit 142 detects faces and smiles of subjects by performing an image recognition process on image data acquired by the image acquisition unit 113. With respect to the process of detecting faces and smiles, the image analysis result information may include information indicating sections and regions in which faces and smiles are detected, and the numbers of faces and smiles in the image data.

For example, the image analysis unit 142 detects a section in which cheers arouse by performing a sound recognition process on image data acquired by the image acquisition unit 113. With respect to the process of detecting cheers, the image analysis result information may include information indicating a section in which cheers are detected and a volume in the image data.

For example, the image analysis unit 142 detects an important scene in a specific event by performing an image recognition process on image data acquired by the image acquisition unit 113. As an important scene, cake cutting, ring exchange or the like in a wedding may be considered. With respect to the process of detecting the important scene, the image analysis result information may include information indicating a section in which the important scene is detected and importance in the image data.

Detection of Information for Scene Segment

For example, the image analysis unit 142 detects information for scene segments on the basis of information input through the input unit 110, includes the detected information for scene segments in image analysis result information and outputs the image analysis result information. As an example, an example in which the image analysis unit 142 detects information for scene segments regarding a color, a camera work, a date and time and a place will be described.

For example, the image analysis unit 142 may detect a color of an image by performing an image recognition process on image data acquired by the image acquisition unit 113. Specifically, the image analysis unit 142 analyzes YUV, RGB or the like of an image and detects a color histogram for each frame or a plurality of frames. Then, the image analysis unit 142 detects a dominant color in each frame as a color of the corresponding frame. Meanwhile, identification information for identifying the detected color is called a color ID. With respect to the process of detecting a color, the image analysis result information may include information indicating a color ID of each section.

For example, the image analysis unit 142 may detect a camera work by performing an image recognition process on image data acquired by the image acquisition unit 113. For example, the image analysis unit 142 detects a camera work of stop, up and down or to the left and right by detecting a motion vector for each frame or a plurality of frames. Further, identification information for identifying the detected camera work is called a camera work ID. With respect to the process of detecting a camera work, the image analysis result information may include information indicating a camera work ID of each section.

For example, the image analysis unit 142 may detect an image-capturing date and time acquired by a clock included in a GPS included in the sensor unit 111, a camera included in the image acquisition unit 113 or the like. Further, identification information for identifying the detected image-capturing date and time is called an image-capturing date and time ID. The same image-capturing date and time ID is attached to sections captured on the same or close dates and times. With respect to the process of detecting an image-capturing date and time, the image analysis result information may include information indicating an image-capturing date and time ID and a section of each image-capturing date and time segment.

For example, the image analysis unit 142 may detect a place where an image is captured on the basis of position information acquired by the GPS included in the sensor unit 111. Further, identification information for identifying the detected image-capturing place is called an image-capturing place ID. The same image-capturing place ID is attached to sections captured in the same or close places. With respect to the process of detecting an image-capturing place, the image analysis result information may include information indicating an image-capturing place ID of each section.

(4.3) Extraction Unit 143

The extraction unit 143 has a function of extracting a plurality of unit images from an input image. Specifically, the extraction unit 143 extracts a plurality of unit images from image data acquired by the image acquisition unit 113 on the basis of an analysis result by the image analysis unit 142. Specifically, the extraction unit 143 extracts a series of images having the same image attribute indicated by analysis result information as unit images.

For example, the extraction unit 143 may extract a series of images having the same scene segment as unit images. In addition, the extraction unit 143 may extract images from which highlights have been detected as unit images. Specifically, the extraction unit 143 may extract a section in which a predetermined motion of a subject such as a jump has been detected as a single unit image. Further, the extraction unit 143 may extract a section in which a predetermined manipulation such as a zooming manipulation, a manipulation of setting an image-capturing mode or the like has been detected, or a section designated by the user as a section to be included in a summary image as a single unit image. Here, the extraction unit 143 may extract a section after zooming as a unit image in the case of the zooming manipulation and may extract a section captured in the simultaneous image-capturing mode as a unit image in the case of the manipulation of setting an image-capturing mode. In addition, the extraction unit 143 may extract a section in which a face or a smile of a subject has been detected, that is, a section in which a predetermined state of the subject, such as smiling or facing a camera is detected, or a section before and after the section as a single unit image. Further, the extraction unit 143 may extract a section having cheering as a single unit image. Moreover, the extraction unit 143 may extract a section in which an image of an important scene in a specific event has been captured as a single unit image. The extraction unit 143 may combine and use such extraction standards.

The extraction unit 143 may set an attention level for an extracted unit image on the basis of an analysis result by the image analysis unit 142. For example, the extraction unit 143 sets a high attention level for a unit image of a section corresponding to a highlight. Specifically, when the image analysis unit 142 analyzes that a motion of a subject in an image-capturing section of a unit image is a predetermined motion, analyzes that a state of the subject is a predetermined state or analyzes that there is a predetermined manipulation, the extraction unit 143 sets a high attention level for the corresponding unit image. In addition, when the image analysis unit 142 analyzes that an image-capturing section of a unit image has cheers or analyzes that there is an important scene, the extraction unit 143 sets a high attention level for the corresponding unit image. Accordingly, a high attention level is set for a unit image corresponding to a section in which a predetermined motion of a subject such as a jump is detected. In addition, a high attention level is set for a unit image corresponding to a section in which a predetermined state of a subject, such as smiling or facing a camera, is detected. Further, a high attention level is set for a unit image corresponding to a section in which a predetermined manipulation such as a zooming manipulation or a manipulation of setting an image-capturing mode is detected. Moreover, a high attention level is set for a unit image corresponding to a section having cheers. Further, a high attention level is set for a unit image corresponding to a section in which an important scene in a specific event such as cake cutting or ring exchange in a wedding is detected. In addition, the extraction unit 143 may set a high attention level for a unit image corresponding to a section designated by the user as a section to be included in a summary image. Also, the extraction unit 143 sets a low attention level in cases other than the aforementioned cases. Hereinafter, a unit image having a high attention level is called a highlight shot and a unit image having a low attention level is called a sub-shot. In addition, identification information for identifying the type of an extracted highlight shot is called a highlight ID. For example, different IDs may be set as highlight IDs depending on highlight types such as a jump, a zooming manipulation, cheers, an important scene and a highlight designated by the user.

(4.4) Editing Unit 144

The editing unit 144 has a function of generating editing information for switching unit images extracted by the extraction unit 143 depending on input music. For example, the editing unit 144 sets input music to be used and a section of the input music to be used as BGM. Then, the editing unit 144 divides the music to be used as BGM according to a music analysis result by the music analysis unit 141 and allocates a unit image extracted by the extraction unit 143 to each section. Accordingly, unit images are switched at a timing at which the music is divided in a summary image. When unit images are allocated, the editing unit 144 may decide all or part of unit images extracted by the extraction unit 143 as unit images adopted in a summary image and allocate an adopted unit image to each section. Further, the editing unit 144 allocates unit images in a principle image-capturing time sequence. Of course, the editing unit 144 may allocate unit images without depending on image-capturing time. In this manner, the editing unit 144 generates editing information by setting input music to be used, a section of the input music to be used as BGM, a unit image to be switched and a timing at which the unit image will be switched. Details of the process of the editing unit 144 will be described in detail below.

(4.5) Operation Mode Controller 145

The operation mode controller 145 has a function of controlling an operation mode in the extraction unit 143 and the editing unit 144. The operation mode controller 145 controls the operation mode depending on a unit image extraction result by the extraction unit 143 and a switching timing setting result by the editing unit 144. Details of the process of the operation mode controller 145 will be described in detail below.

(4.6) Summary Image Generation Unit 146

The summary image generation unit 146 has a function of generating a summary image composed of unit images switched on the basis of music and editing information. For example, the summary image generation unit 146 generates a summary image by using music designated by the editing information as BGM and switching and connecting unit images designated by the editing information at a designated timing.

3. DETAILS OF FUNCTIONS

The basic configuration of the image processing apparatus 100 according to the present embodiment has been described above. Next, the functions of the image processing apparatus 100 will be described in detail below.

[3.1. Unit Image Extraction Process]

The extraction unit 143 extracts a plurality of unit images from image data acquired by the image acquisition unit 113 on the basis of an analysis result by the image analysis unit 142. Specifically, the extraction unit 143 extracts unit images depending on image attributes analyzed by the image analysis unit 142. For example, the extraction unit 143 extracts highlight shots and sub-shots from the image data on the basis of information for scene segments and information indicating highlights. Hereinafter, the unit image extraction process based on an image analysis result will be described in detail with reference to FIG. 5.

Figure 5:
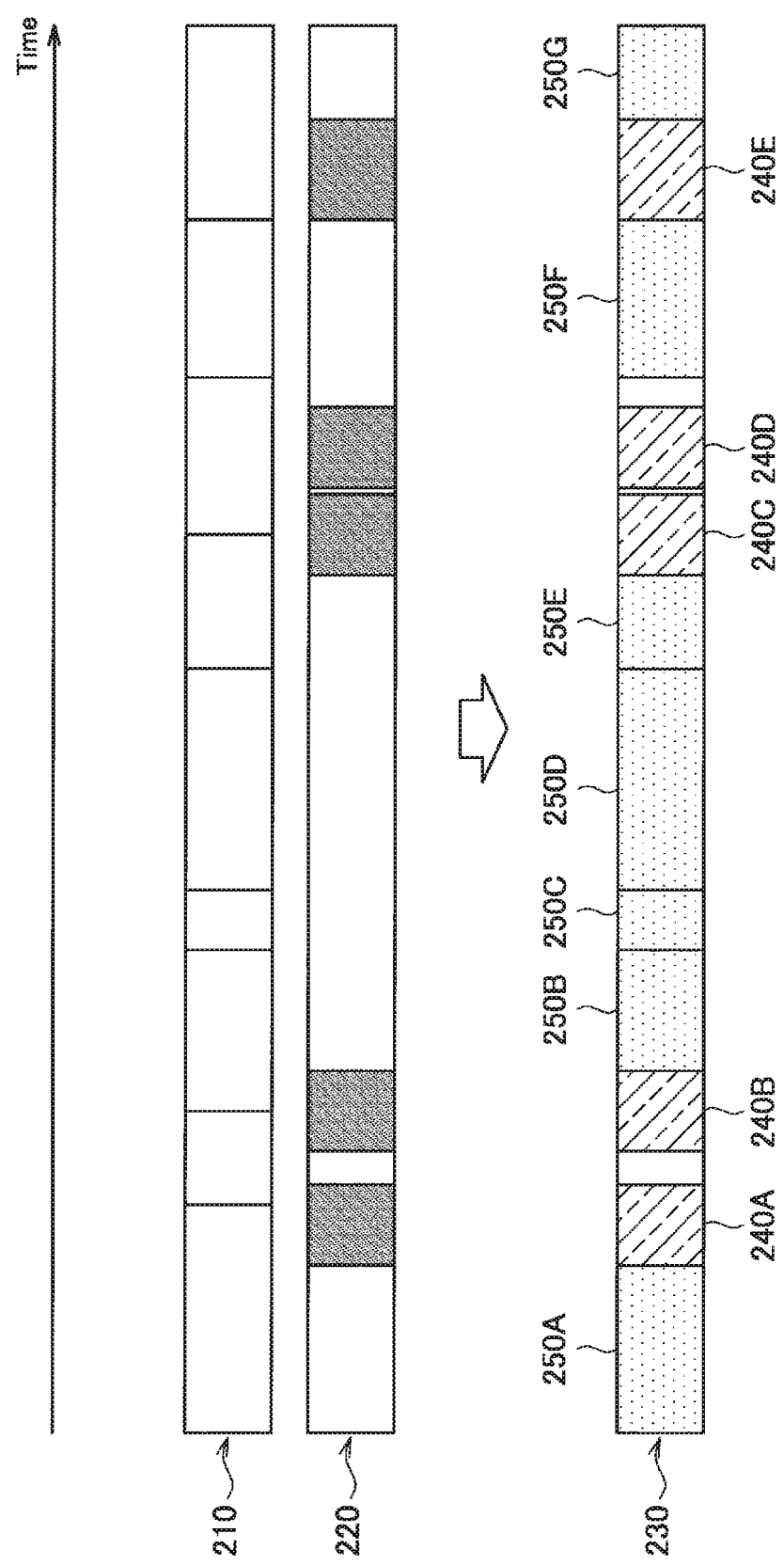
FIG. 5 is an explanatory diagram of a unit image extraction process according to the present embodiment.

FIG. 5 is an explanatory diagram of the unit image extraction process according to the present embodiment. FIG. 5 roughly illustrates a process through which the extraction unit 143 extracts highlight shots 260A to 260E and sub-shots 270A to 270G As illustrated in FIG. 5, first of all, the extraction unit 143 generates scene segments 210 on the basis of information for scene segments. For example, the extraction unit 143 generates the scene segments 210 by segmenting sections having the same color ID. The extraction unit 143 may use a plurality of pieces of information for scene segments and may generate the scene segments 210 by segmenting sections having the same color ID, the same camera work ID, the same image-capturing place ID and the same image-capturing date and time ID, for example. Subsequently, the extraction unit 143 associates the scene segments 210 with highlights 220 and extracts highlight shots 240A to 240E from an input image 230. Then, the extraction unit 143 extracts sections divided by the scene segments 210 of the input image 230 as sub-shots. Here, the extraction unit 143 may extract sub-shots 250 by excluding sections that overlap with the highlight shots 240, are short (e.g., shorter than a longest allocation section which will be described below), are extremely bright or dark, or have an unstable camera work. Hereinafter, the number of unit images extracted by the extraction unit 143 on the basis of image result information, that is, highlight shots and sub-shots, will be called an extraction number.

[3.2. Switching Timing Setting Process]

The editing unit 144 sets a unit image switching timing depending on input music on the basis of music analysis result information output from the music analysis unit 141. For example, the editing unit 144 may generate editing information for switching unit images extracted by the extraction unit 143 depending on components, measures or beats analyzed by the music analysis unit 141. Specifically, the editing unit 144 divides the input music at a component switching timing, a measure switching timing or a timing depending on beats and sets a unit image switching timing at the divided position.

For example, the editing unit 144 may generate editing information for switching unit images for every one beat at the timing depending on beats. In such a case, the unit images are switched with good tempo and sense of speed and thus may excite the emotion of a viewer. Here, the editing unit 144 may generate editing information for switching unit images for every multiple beats when the rate of beats of the music exceeds a threshold value. For example, unit images may be switched for every two beats. Accordingly, unit images are prevented from switching excessively fast when BGM is high tempo music, and thus giving a pressing impression to the viewer may be avoided.

For example, the editing unit 144 may set the number of times of performing switching of unit images depending on a beat for every type of the structure of music analyzed by the music analysis unit 141. Specifically, the editing unit 144 may set the number of times of performing switching of unit images depending on a beat for every component of the music such as an intro part and a chorus part. Furthermore, the editing unit 144 may perform switching of unit images depending on a beat in a part that meets the aforementioned predetermined conditions specified by the music analysis unit. Specifically, the editing unit 144 may perform switching of unit images depending on a beat in a particularly important part in the chorus part, such as a part in which a vocal starts to sing or a part in which the tone of the vocal is highest. Accordingly, it may be possible to perform switching of unit images depending on a beat in accordance with the climax of BGM, thereby exciting the emotion of the viewer more effectively.

For example, the editing unit 144 may select whether to perform switching of unit images depending on a beat in units of measure of music analyzed by the music analysis unit 141. In this case, switching of unit images depending on a beat is performed in units of measure. It appears that a person listens to music while being aware of measures and predicts progression consciously or unconsciously. Accordingly, switching of unit images depending on a beat in units of measure is easily accepted by the viewer and thus it may be possible to easily excite the emotion of the viewer. Furthermore, matching between switching of unit images depending on a beat in units of measure and switching of unit images in units of measure is good. In addition, the editing unit 144 may separate measures in which switching of unit images depending on a beat is performed. Accordingly, switching of unit images depending on a beat is not performed in a plurality of consecutive measures and thus excessive switching is prevented.

Meanwhile, sections of music divided at the set switching timing are called allocation sections in the following. That is, setting the switching timing corresponds to setting allocation sections for allocating each unit image having a length to a summary image. A longest section from among allocation sections will be called a longest allocation section.

The aforementioned unit image switching timing may be set on the basis of a previously set probability table. Here, the editing unit 144 may conform to rules of necessarily switching unit images at the timing of switching components of music, setting the length of a longest allocation section and the like.

Meanwhile, it is desirable that the aforementioned unit images switched depending on a beat in a single measure be similar to each other. Accordingly, giving a complicated impression to the viewer can be avoided. Similarity to each other means that at least one of motions of subjects, image-capturing dates and times, image-capturing places, colors and camera works, for example, are close to each other. For example, it may be said that unit images in the same color, one of which has a camera work of moving from the right to the left and the other of which has a camera work of moving from the left to the right, are similar to each other. In addition, it may be said that unit images having jumping subjects are similar to each other. Further, similarity to each other may refer to, for example, inclusion of a specific subject in unit images. For example, it may be said that unit images including the same person or persons in the same team are similar to each other. Here, at least one of unit images switched depending on a beat in a single measure may be adopted twice or more. In the case of a quadruple time, for example, unit images may be adopted in the order of unit image A, unit image B, unit image A and unit image B or in the order of unit image A, unit image A, unit image A and unit image A. Accordingly, giving a complicated impression to the viewer may be avoided more easily. Of course, unit images switched depending on a beat in a single measure may be different. In the case of a quadruple time, for example, unit images may be adopted in the order of unit image A, unit image B, unit image C and unit image D.

Hereinafter, the unit image switching timing setting process based on a music analysis result will be described in detail with reference to FIG. 6.

Figure 6:
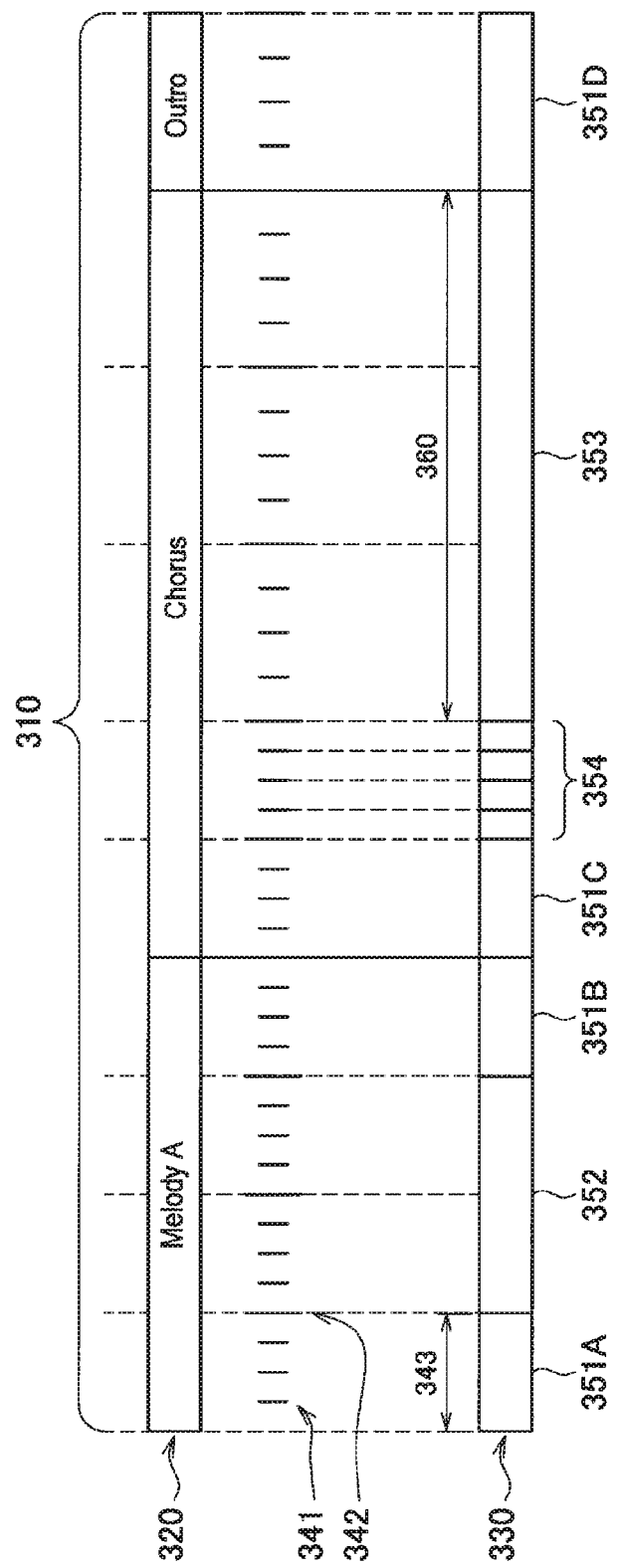
FIG. 6 is an explanatory diagram of a unit image switching timing setting process according to the present embodiment.

FIG. 6 is an explanatory diagram of the unit image switching timing setting process according to the present embodiment. FIG. 6 illustrates components 320 of a section 310 of music used as BGM and a set switching timing 330. Division lines of the switching timing 330 indicate switching timings and sections divided by the division lines indicate allocation sections. As illustrated in FIG. 6, a melody part, a chorus part and an ending part are included as the components 320. In addition, music illustrated in FIG. 6 is quadruple-time music including one measure head beat 342 and three beats 341 in one measure 343. In the example illustrated in FIG. 6, the editing unit 144 sets a unit image switching timing at a timing at which the components 320 switch from melody to chorus and a timing at which chorus switches to ending. In addition, the editing unit 144 sets allocation sections 351A to 351D in units of one measure, sets an allocation section 352 in units of two measures, sets an allocation section 353 in units of three measures, and sets an allocation section 354 in units of one beat. Accordingly, unit images are switched for every beat in the section 354. In this case, a longest allocation section 360 corresponds to three measures.

The Table 1 below shows the number of unit images adopted in the entire BGM and each component for every switching timing type (allocation section length) in the example illustrated in FIG. 6.

TABLE 1

| Switching timing | The number of unit images adopted for every component | | | |
| --- | --- | --- | --- | --- |
| | Melody part | Chorus part | Ending part | Entire BGM |
| Every one beat | 0 | Up to 4 | 0 | Up to 4 |
| Every one measure | 2 | 1 | 1 | 4 |
| Every two measures | 1 | 0 | 0 | 1 |
| Every three measures | 0 | 1 | 0 | 1 |

Further, when unit images are switched for every one beat, the number of selected unit images is a maximum of 4 since one unit image may be adopted multiple times. Referring to the Table 1, a maximum of 10 unit images are adopted in a summary image in the entire sections in the example illustrated in FIG. 6. In addition, the longest allocation section corresponds to three measures in the example illustrated in FIG. 6.

As described above, the number of unit images adopted in a summary image is decided by the number of allocation sections decided by the switching timing set by the editing unit 144 on the basis of music analysis result information, that is, the number of divisions of music. Hereinafter, the number of divisions of music by the editing unit 144 on the basis of music analysis result information will be called an adoption number. For example, the adoption number is a maximum of 10 in the example illustrated in FIG. 10. More specifically, when the content of switching depending on a beat are unit image A, unit image B, unit image C and unit image D, the adoption number is 10. Further, when the content of switching depending on a beat are unit image A, unit image B, unit image A and unit image B, the adoption number is 8.

The editing unit 144 may switch unit images extracted by the extraction unit 143 at the switching timing set in the switching timing setting process. In addition, the editing unit 144 may change the switching timing set in the switching timing setting process. For example, the editing unit 144 may change the order of allocation sections while maintaining the total number of allocation sections (corresponding to the adoption number) and the number of allocation sections for each allocation section length, set in the switching timing setting process. Such an example will be described in an adoption section setting process below.

[3.3. Operation Mode Decision Process]

The order of the aforementioned switching timing setting process and the unit image extraction process is arbitrary.

When the switching timing setting process is performed first, a restriction according to the switching timing setting process is imposed on the unit image extraction process. For example, the extraction unit 143 may impose a restriction of extraction of at least the number of unit images equal to or greater than the adoption number. According to this restriction, unit images are switched without overlapping in a summary image. In addition, the extraction unit 143 may impose a restriction of extraction of unit images having lengths equal to or greater than the longest allocation section (corresponding to three measures in the example illustrated in FIG. 6) such that each extracted unit image may be used at any timing. According to this restriction, any extracted unit image may be allocated to the longest allocation section.

When the unit image extraction process is performed first, a restriction according to the unit image extraction process is imposed on the switching timing setting process. For example, the editing unit 144 may impose a restriction of setting a switching timing such that a fewer unit images than the number of unit images extracted by thee extraction unit 143 are allocated. According to this restriction, unit images are switched without overlapping in a summary image. In addition, the editing unit 144 may impose a restriction of setting a switching timing such that an allocation section has a length depending on the length of each unit image extracted by the extraction unit 143. According to this restriction, an appropriate allocation section may be allocated to each unit image extracted by the extraction unit 143.

The operation mode controller 145 may change operation modes of the extraction unit 143 and the editing unit 144 in order to satisfy such restrictions. Hereinafter, a case in which the switching timing setting process is performed first will be described.

First of all, the operation mode controller 145 causes the extraction unit 143 and the editing unit 144 to operate in a normal processing mode (first operation mode) as an operation mode. In the normal processing mode, the editing unit 144 sets a unit image switching timing using music analysis result information as described above. In addition, the extraction unit 143 extracts unit images using image analysis result information as described above.

The operation mode controller 145 determines whether to change the operation mode and perform at least one of a re-extraction process by the extraction unit 143 and a re-adoption process by the editing unit 144 depending on a size relation between the extraction number and the adoption number in the normal processing mode. Here, the extraction process refers to the aforementioned unit image extraction process. In addition, the adoption process refers to the aforementioned switching timing setting process. With respect to the size relation between the extraction number and the adoption number, there is a restriction that the extraction number is equal to or greater than the adoption number as described above. When this restriction is not satisfied, the operation mode controller 145 may satisfy this restriction by changing the operation mode.

For example, the operation mode controller 145 determines that the operation modes is not changed when the adoption number equals the extraction number or the extraction number is greater than the adoption number in the normal processing mode. That is, the operation mode controller 145 determines that the operation mode is not changed when the extraction number is equal to or greater than the adoption number. This is because the aforementioned restriction that the extraction number is equal to or greater than the adoption number is satisfied without changing the operation mode.

Conversely, when the extraction number is smaller than the adoption number in the normal processing mode, the operation mode controller 145 may change the operation mode to another operation mode. For example, the operation mode controller 145 may change the operation mode to a segmentation processing mode (second operation mode) or a retry processing mode (fifth operation mode).

In the segmentation processing mode, the extraction unit 143 segments at least one of unit images extracted in the normal processing mode into two or more unit images. For example, the extraction unit 143 may have a unit image having a length exceeding a threshold value from among unit images extracted in the normal processing mode as a segmentation target. In addition, the extraction unit 143 may decide the number of segmentations such that a unit image after segmentation is equal to or greater than the longest allocation section. Since the extraction number increases according to the segmentation processing mode, the restriction that the extraction number is equal to or greater than the adoption number may be satisfied.

In the retry processing mode, the editing unit 144 sets a switching timing by dividing music at predetermined intervals. In addition, the extraction unit 143 extracts unit images obtained by dividing an image at predetermined intervals. For example, the editing unit 144 divides input music at equal intervals or previously set intervals and sets the division timing as a switching timing. Further, the extraction unit 143 extracts the divided images as unit images by dividing an input image at equal intervals or previously set intervals. That is, the extraction unit 143 extracts unit images without considering highlights. Since the adoption number and the extraction number may be arbitrarily controlled by controlling dividing intervals in the retry processing mode, the restriction that the extraction number is equal to or greater than the adoption number may be satisfied.

The operation modes described above will be explained through comparison with reference to FIG. 7. FIG. 7 is an explanatory diagram of an example of operation modes of the image processing apparatus 100 according to the present embodiment. As illustrated in FIG. 7, in the normal processing mode, the image analysis result information and the music analysis result information are used and a summary image having "high" image quality is generated. In the segmentation processing mode, the image analysis result information is modified and used. Specifically, a unit image 410 extracted in the normal processing mode is segmented into unit images 411 and 412, as illustrated in FIG. 7. In the same manner, a unit image 420 is segmented into unit images 421, 422 and 423 and a unit image 430 is segmented into unit images 431, 432 and 433. In the segmentation processing mode, one original unit image can be segmented into a plurality of unit images and adopted in a summary image. That is, since similar unit images can be adopted in a summary image, the summary image has "medium" image quality. In the retry processing mode, the image analysis result information and the music analysis result information are ignored. Specifically, a switching timing is at equal intervals and unit images are equal divisions of an input image, as illustrated in FIG. 7. Accordingly, a summary image generated in the retry processing mode becomes monotonous and thus has "low" image quality.

The operation mode controller 145 may change the operation mode to an operation mode other than the segmentation processing mode and the retry processing mode when the extraction number is smaller than the adoption number in the normal processing mode. For example, the operation mode controller 145 may change the operation mode to a longest allocation section reduction processing mode (third operation mode) or a sub-shot condition mitigation processing mode (fourth operation mode).

In the longest allocation section reduction processing mode, the editing unit 144 reduces the longest allocation section in compared to the normal processing mode. Accordingly, the extraction unit 143 extracts unit images with a length equal to or greater than a longest allocation section shorter than that in the normal processing mode. In the example illustrated in FIG. 6, the extraction unit 143 extracts unit images with a length equal to or greater than three measures in the normal processing mode. On the other hand, the extraction unit 143 extracts unit images with a length equal to or greater than two measures, for example, in the longest allocation section reduction processing mode. Accordingly, the extraction unit 143 may extract an image of a section, which could not be extracted as a sub-shot because it corresponds to only two measures and is short in the normal processing mode, as a sub-shot. In this manner, the extraction number increases in the longest allocation section reduction processing mode and thus the restriction that the extraction number is equal to or greater than the adoption number may be satisfied.

In the sub-shot condition mitigation processing mode, the extraction unit 143 mitigates a condition related to an analysis result by the image analysis unit 142 for extracting unit images in compared to the normal processing mode. For example, the extraction unit 143 extracts even a short section as a unit image, extracts even an extremely bright or dark section as a unit image or extracts even a section having an unstable camera work as a unit image. In this manner, the extraction number increases in the sub-shot condition mitigation processing mode and thus the restriction that the extraction number is equal to or greater than the adoption number may be satisfied.

The order of the aforementioned operation modes is arbitrary. For example, the operation mode controller 145 may change the operation mode in the order of the segmentation processing mode, the longest allocation section reduction processing mode, the sub-shot condition mitigation processing mode and the retry processing mode after the normal processing mode. In addition, the operation mode controller 145 may use any combination of the aforementioned operation modes. Further, the operation mode controller 145 may perform processes adopting all or part of the aforementioned operation modes in parallel and select an operation mode in which a result having highest quality is obtained.

[3.4. Unit Image Selection Process]

(Overview)

The editing unit 144 selects unit images to be adopted in a summary image from unit images extracted by the extraction unit 143. For example, the editing unit 144 selects unit images corresponding to the adoption number while prioritizing highlights. Hereinafter, the unit image selection process will be described with reference to FIG. 8.

Figure 8:
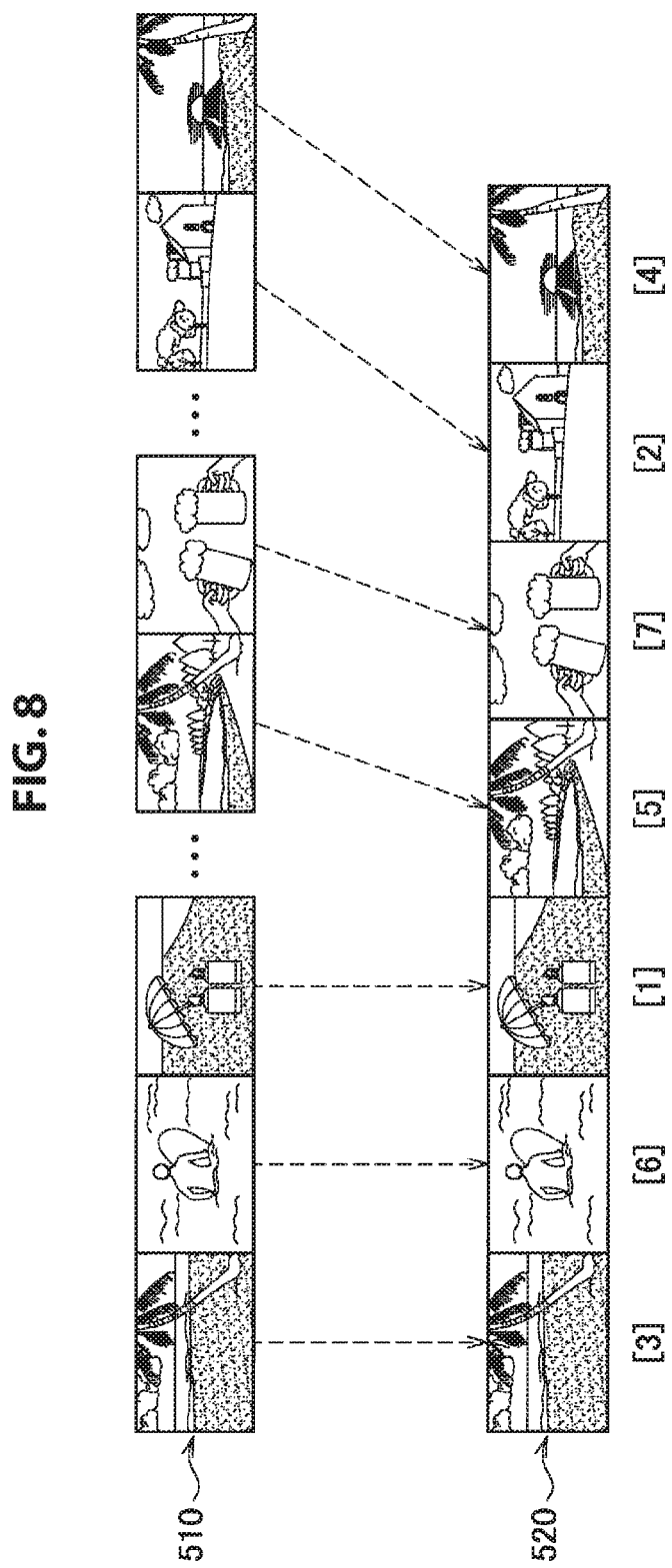
FIG. 8 is an explanatory diagram of a unit image selection process according to the present embodiment.

FIG. 8 is an explanatory diagram of a unit image selection process according to the present embodiment. As illustrated in FIG. 8, first of all, the editing unit 144 selects one or more sub-shots 510 as unit image candidates to be adopted in a summary image. Selected shots 520 are unit images selected as unit image candidates to be adopted in the summary image. For example, the editing unit 144 may select the sub-shots 510 such that scene segments are distributed and/or the sub-shots conform to a theme designated by the user. For example, the editing unit 144 selects the sub-shots 510 in descending order of evaluation values according to an evaluation function which will be described below. In the figure, [1], [2], [3], [4], [5], [6] and [7] indicate a selection order using the evaluation function. In addition, the adoption number is 7. As illustrated in FIG. 8, the editing unit 144 arranges selected unit images in an image-capturing time sequence in the selected shots 520.

Figure 9:
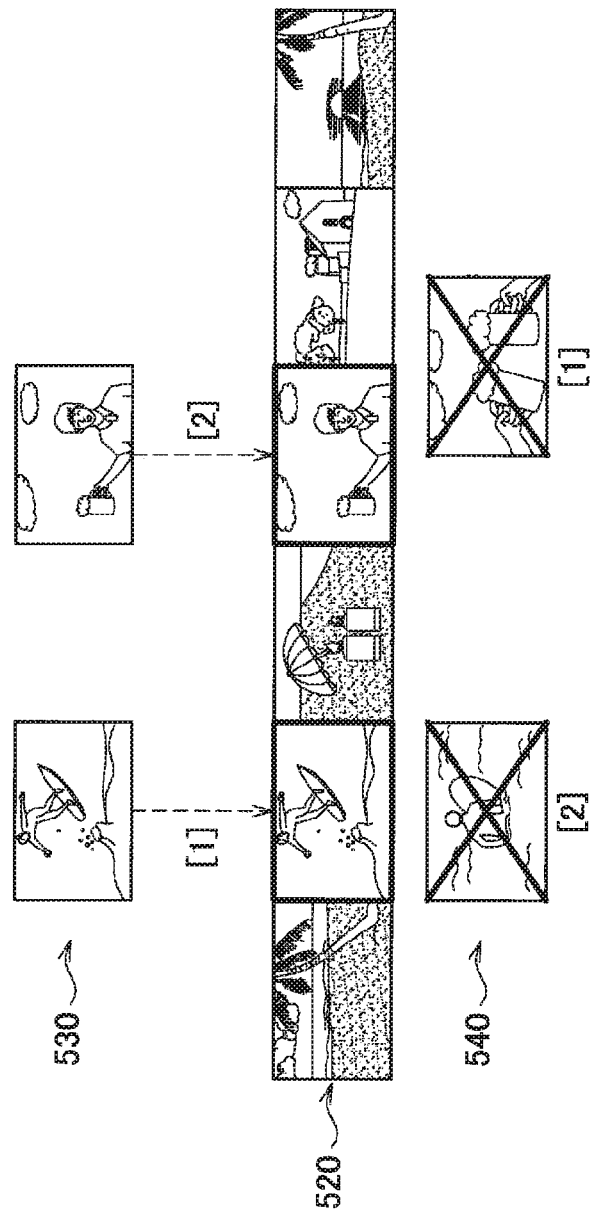
FIG. 9 is an explanatory diagram of a unit image selection process according to the present embodiment.

FIG. 9 is an explanatory diagram of a unit image selection process according to the present embodiment. As illustrated in FIG. 9, the editing unit 144 selects highlight shots 530 as unit image candidates to be adopted in a summary image. For example, the editing unit 144 may select the highlight shots 530 such that neighboring unit images do not correspond to the same highlights in the selected shots. For example, the editing unit 144 selects the highlight shots 530 in descending order of evaluation values according to an evaluation function which will be described below. In addition, the editing unit 144 removes sub-shots 540 having low priority levels from among previously selected sub-shots instead of selecting the highlight shots 530. As the sub-shots 540 having low priority levels, for example, sub-shots selected later may be considered. [1] and [2] in the figure indicate a selection order and a removal order using the evaluation function.

(Sub-Shot Evaluation Function)

Hereinafter, an example of the evaluation function used to select a sub-shot will be described. For example, the editing unit 144 may select a sub-shot using the evaluation function represented by the Formula 1 below.

[Math. 1]

$$P = W_{si}Si + W_{ss}Ss \quad \text{(Formula 1)}$$

In the above formula 1, $W_{si}Si$ and $W_{ss}Ss$ are terms related to scene segments. Symbols $W_{si}$ and $W_{ss}$ are weights of the terms and may be arbitrarily set by the editing unit 144. Symbol Si is a value (score) related to a segment ID of a scene segment. For example, symbol Si is calculated on the basis of a color ID, a camera work ID, an image-capturing date and time ID and/or a place ID used in a scene segment. For example, the score may be calculated such that the score approaches the rate of segment IDs in accordance with a previously set theme in order to comply with the previously set theme. In addition, the score may be calculated such that segment IDs are equally selected in order to reduce visual deviation. Symbol Ss is a score related to stability of a scene segment. Symbol Ss is calculated on the basis of stability (degree to which a time variation is small) of a color and/or a camera work used in a scene segment. For example, a higher score may be calculated as stability increases. In addition, the editing unit 144 may add a term related to image files before selection to the above Formula 1 to distribute the image files before selection. Further, the editing unit 144 may add a term related to time until selected shots before and after selection to the above Formula 1 to distribute distribution of image-capturing time.

The editing unit 144 calculates the evaluation function represented by the above formula 1 for each unselected sub-shot and selects a sub-shot having the highest evaluation value whenever one sub-shot is selected. Meanwhile, the score of each symbol may be changed in relation with previously selected sub-shots.

(Highlight Shot Evaluation Function)

Hereinafter, an example of the evaluation function used to select a highlight shot will be described. For example, the editing unit 144 may select a highlight shot using the evaluation function represented by the Formula 2 below.
[Math. 2]

$$P = W_{hi}Hi + W_{hs}Hs + W_{st}Si + W_{st}Ss \quad \text{(Formula 2)}$$

In the above formula 2, $W_{hi}Hi$ and $W_{hs}Hs$ are terms related to highlights. Symbols $W_{Hi}$ and $W_{hs}$ are weights of the terms and may be arbitrarily set by the editing unit 144. Symbol Hi is a score related to a highlight ID. For example, symbol Hi is calculated on the basis of a highlight ID. For example, the score may be calculated such that the score approaches the rate of highlight IDs in accordance with a previously set theme in order to comply with the previously set theme. In addition, the score may be calculated such that highlight IDs are equally selected in order to reduce visual deviation. Symbol Hs is a score related to a value of a highlight. With respect to symbol Hs, a higher score may be calculated as the time of staying in the air increases and the amount of turning increases in the case of a snowboard jump, for example. Other symbols are the same as the above Formula 1.

The editing unit 144 calculates the evaluation function represented by the above Formula 2 for each unselected highlight shot and selects a highlight shot having the highest evaluation value whenever one highlight shot is selected. Then, the editing unit 144 removes sub-shots selected later from among previously selected sub-shots. Meanwhile, the score of each symbol may be changed in relation with previously selected highlight shots.

The editing unit 144 may avoid consecution of highlight shots of a jump, for example, using symbol Hi. With respect to a highlight shot according to a section designated by the user as a section to be included in a summary image, the score according to symbol Hi may be ignored. In such a case, unit images of a jump designated by the user as highlights can continue. In addition, the editing unit 144 may preferentially select a highlight shot having a high value using the symbol Hs.

Further, the editing unit 144 may set a selection number of highlight shots having the same highlight ID to be lower than a previously set number. For example, the editing unit 144 may select a highlight shot that satisfies the formula below. According to the Formula below, even when a highlight shot of a jump may be selected up to twice originally, the number of times of selection may be 3 or more with respect to a jump having a high score of symbol Hs and the number of times of selection may be less than 2 with respect to a jump having a low score of symbol Hs.

Highlight score Hs—attenuation coefficient×number of times of selection threshold value (Formula 3)

An example of the unit image selection process has been described above. Although an example of selecting sub-shots first and subsequently selecting highlight shots has been described above, the present technology is not limited to such an example. For example, the editing unit 144 may select highlight shots first and subsequently select sub-shots. In such a case, the editing unit 144 selects highlight shots first and selects as many sub-shots as the number obtained by subtracting the number of selected highlight shots from the adoption number. In addition, the editing unit 144 may simultaneously select highlight shots and sub-shots. In such a case, the editing unit 144 may apply a common evaluation function to the highlight shots and the sub-shots. Further, since the scores (symbols Hi and Hs) related to highlight IDs and values of highlight shots are not present for sub-shots, the common evaluation function is applicable by setting the corresponding terms to an arbitrary value (e.g., 0).

[3.5. Adoption Section Setting Process]

The editing unit 144 sets adoption sections depending on content of unit images extracted by the extraction unit 143 for the unit images and generates editing information for adopting an adoption section set for each of a plurality of unit images. For example, the editing unit 144 sets adoption sections to be adopted in a summary image depending on content of unit images and generates editing information for connecting the set adoption sections. Further, the position of an adoption section is a section adopted in a summary image in a unit image. An adoption section may be a whole unit image or part of a unit image.

For example, the editing unit 144 may set the position of an adoption section in a unit image depending on the content of the unit image. For example, the editing unit 144 may set the position of an adoption section depending on the content of a unit image, such as whether the unit image is a highlight shot or a sub-shot and attributes such as the highlight ID, color ID and camera work ID. The position of the adoption section refers to the position of a section set as an adoption section in the whole unit image and may be the first half, middle part, second half or the like of the unit image, for example. Accordingly, more appropriate sections are set depending on content of unit images and adopted in a summary image in order to excite the emotion of the viewer, for example.

For example, the editing unit 144 may set the positions of adoption sections in unit images depending on a motion of a subject of an image analyzed by the image analysis unit 142. For example, a highlight shot related to a snowboard jump is considered. The editing unit 144 may set an adoption section at any of positions during approaching, from approaching to a stay in the air, during the stay in the air, from the stay in the air to a post-landing, and from a landing to the post-landing with respect to a unit image in which a motion of a subject is analyzed by the image analysis unit 142 as a jump. In such a case, the editing unit 144 may set adoption sections focused on various noteworthy interesting points of the jump. As another example, a highlight shot related to a snowboard turn (change of a moving direction) is considered. The editing unit 144 may set an adoption section at any of positions from a before-turn to turning, during turning, and from turning to an after-turn with respect to a unit image in which a motion of a subject is analyzed by the image analysis unit 142 as change of a moving direction. In such a case, the editing unit 144 may set adoption sections focused on various noteworthy interesting points of the turn.

For example, when adoption sections are set for two or more highlight shots of the same types (same highlight ID), the editing unit 144 may distribute the positions of the adoption sections in the two or more highlight shots. For example, when selected shots include a plurality of highlight shots related to a snowboard jump, the editing unit 144 may distribute the positions of adoption sections during approaching, from approaching to a stay in the air, during the stay in the air, from the stay in the air to a post-landing, and from a landing to the post-landing. Similarly, when selected shots include a plurality of highlight shots related to a snowboard turn, the editing unit 144 may distribute the positions of adoption sections from a before-turn to turning, during turning, and from turning to an after-turn. In such a case, since adoption sections are set from different viewpoints even for highlight shots of the same type, the viewer may view a summary image without being bored.

For example, the editing unit 144 may generate editing information such that a highlight shot is connected to a different type of highlight shot or a sub-shot. For example, the editing unit 144 allocates highlight shots such that highlight shots having the same highlight ID do not continue or allocate a sub-shot between the highlight shots in the case of consecutive highlight shots. Accordingly, the viewer may view a summary image without being board because the summary image is conspicuous.

For example, the editing unit 144 may set an adoption section of a highlight shot to be longer than an adoption section of a sub-shot. For example, the editing unit 144 preferentially allocates a highlight shot to a long allocation section. Accordingly, the viewer may view the highlight shot for a longer time and thus the emotion of the viewer may be excited more effectively.

Figure 10:
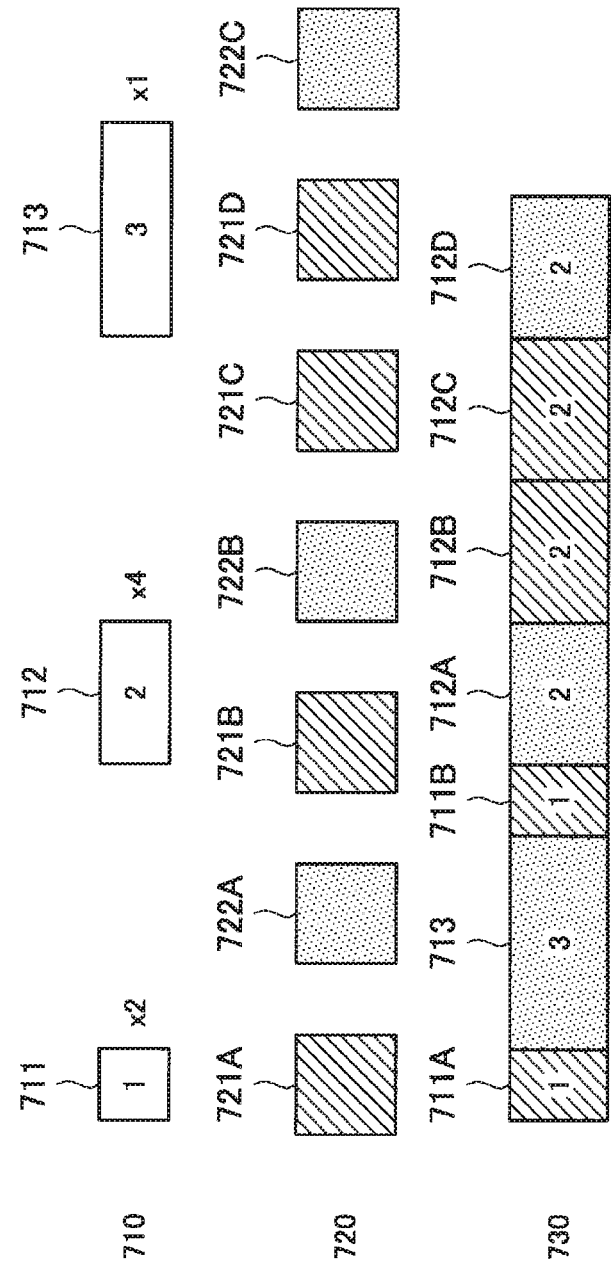
FIG. 10 is an explanatory diagram of an adoption section setting process according to the present embodiment.
Figure 11:
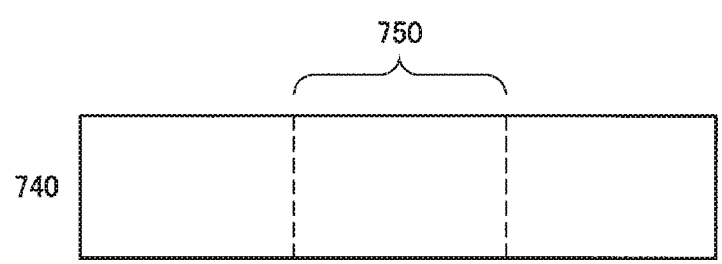
FIG. 11 is an explanatory diagram of an adoption section setting process according to the present embodiment.
Figure 12:
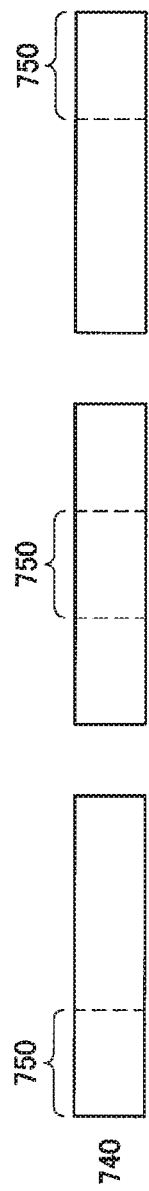
FIG. 12 is an explanatory diagram of an adoption section setting process according to the present embodiment.

The adoption section setting process will be described in detail with reference to FIGS. 10 to 12. FIGS. 10 to 12 are explanatory diagrams of an adoption section setting process according to the present embodiment. Particularly, in FIG. 10, an example of preferentially allocating a highlight shot to a long allocation section is described.

As illustrated in FIG. 10, a case in which content of allocation sections 710 set in the switching timing setting process include two allocation sections 711 in units of one measure, four allocation sections 712 in units of two measures and one allocation section 713 in units of three measures is assumed. For example, the editing unit 144 preferentially allocates highlight shots to long allocation sections according to a rule shown in the Table 2 below. Further, the rule shown in the Table 2 below may be further subdivided depending on highlight type, scene segment type and the like.

TABLE 2

| Unit image type | Top priority | Second | Third | Fourth |
| --- | --- | --- | --- | --- |
| Highlight shot | 3 measures | 2 measures | 1 measure | Beat unit |
| Sub-shot | Beat unit | 1 measure | 2 measures | 3 measures |

As illustrated in FIG. 10, content of selected shots 720 include shots in the order of a sub-shot 721A, a highlight shot 722A, a sub-shot 721B, a highlight shot 722B, a sub-shot 721C, a sub-shot 721D and a highlight shot 722C. The editing unit 144 generates editing information 730 for setting unit images and a timing at which the unit images will be switched by allocating an allocation section to each unit image as described below.

First of all, the editing unit 144 allocates an allocation section 711A in units of one measure having highest priority from among the remaining allocation sections to the sub-shot 721A corresponding to the first selected shot 720. Subsequently, the editing unit 144 allocates the allocation section 713 in units of three measures having highest priority from among the remaining allocation sections to the highlight shot 722A corresponding to the second selected shot 720. Then, the editing unit 144 allocates an allocation section 711B in units of one measure having highest priority from among the remaining allocation sections to the sub-shot 721B corresponding to the third selected shot 720. Thereafter, the editing unit 144 allocates an allocation section 712A in units of two measures having highest priority from among the remaining allocation sections to the highlight shot 722B corresponding to the fourth selected shot 720. Next, the editing unit 144 allocates an allocation section 712B in units of two measures having highest priority from among the remaining allocation sections to the sub-shot 721C corresponding to the fifth selected shot 720. Subsequently, the editing unit 144 allocates an allocation section 712C in units of two measures having highest priority from among the remaining allocation sections to the sub-shot 721D corresponding to the sixth selected shot 720. Finally, the editing unit 144 allocates the remaining allocation section 712D in units of two measures to the highlight shot 722C corresponding to the seventh selected shot 720.

Meanwhile, allocation is performed for every one component such as melody. In such a case, switching of unit images is guaranteed at a timing at which a component is switched irrespective of allocation performed in the component.

Next, an example of setting an adoption section in one unit image will be described with reference to FIGS. 11 and 12. For example, as illustrated in FIG. 11, the editing unit 144 basically sets an adoption section 750 to the center part of a unit image 740. On the other hand, the editing unit 144 may set the adoption section 750 to the first half part, central part or second half part of the unit image 740 for a highlight shot such as a turn, as illustrated in FIG. 12. Here, the length of the adoption section 750 set by the editing unit 144 corresponds to the length of an allocation section allocated to each unit image described with reference to FIG. 10.

The functions of the image processing apparatus 100 according to the present embodiment have been described above. Next, an example of the operation process of the image processing apparatus 100 according to the present embodiment will be described with reference to FIG. 13.

4. OPERATION PROCESS

Figure 13:
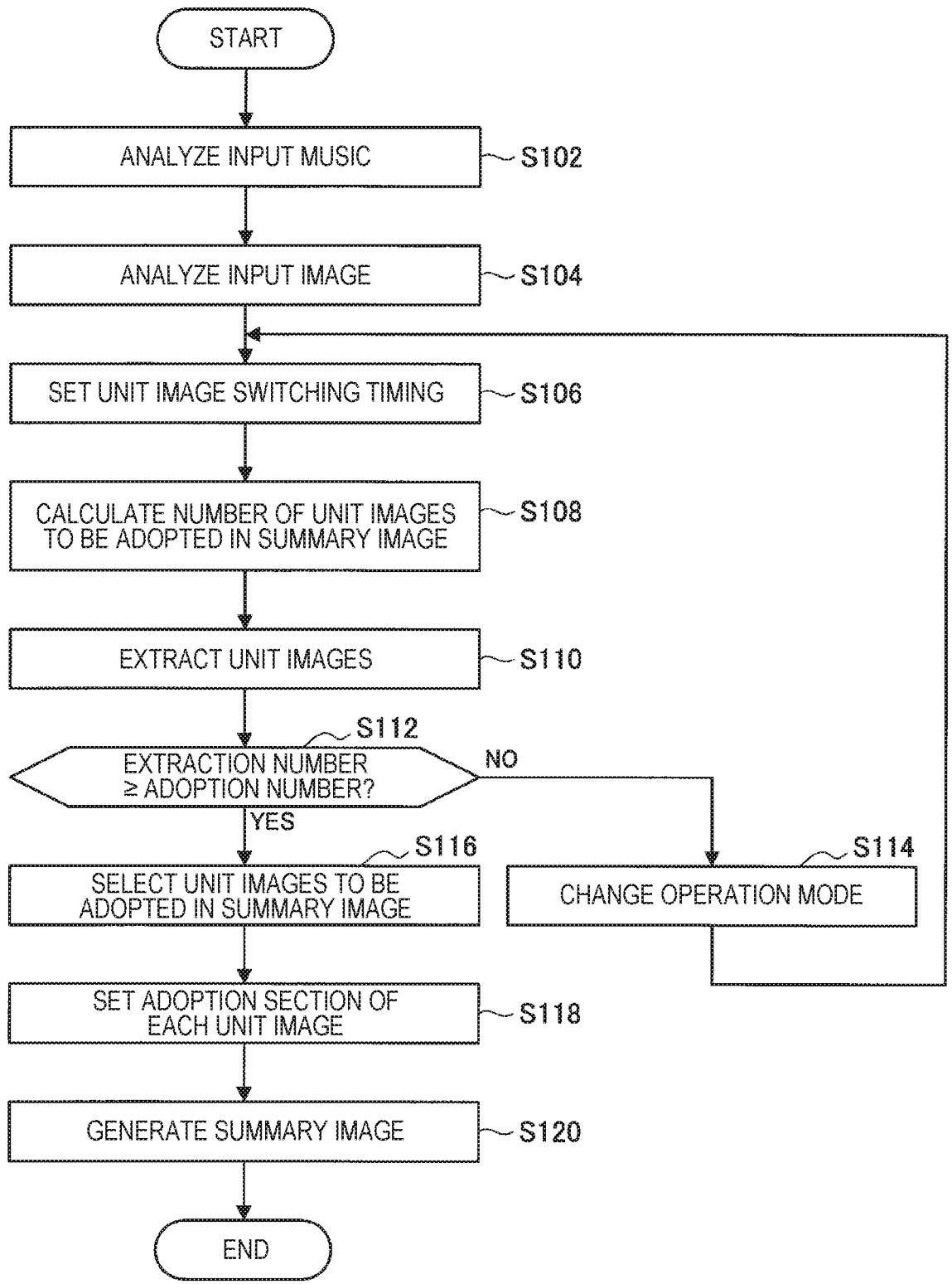
FIG. 13 is a flowchart illustrating an example of a summary image generation process flow executed in the image processing apparatus according to the present embodiment.

FIG. 13 is a flowchart illustrating an example of a summary image generation process flow executed in the image processing apparatus 100 according to the present embodiment.

As illustrated in FIG. 13, first of all, the music analysis unit 141 analyzes input music in step S102. For example, the music analysis unit 141 analyzes the structure of the music such as an intro part and a chorus part, specifies a particularly important part in the chorus part and analyzes beats and measures on the basis of music theory.

Subsequently, the image analysis unit 142 analyzes an input image in step S104. For example, the image analysis unit 142 detects a subject motion, detects a user manipulation, detects a face and a smile, detects colors or detects a camera work.

Then, the editing unit 144 sets a unit image switching timing in step S106. For example, the editing unit 144 sets a switching timing every beat, every one measure or every multiple measures on the basis of the music analysis result in step S102. Here, the editing unit 144 may set the unit image switching timing such that switching is performed depending on the particularly important part in the chorus part. The length of a longest allocation section is decided according to the present step.

Thereafter, the editing unit 144 calculates the number of unit images to be adopted in a summary image (adoption number) in step S108. For example, the editing unit 144 calculates the adoption number on the basis of the number of allocation sections determined by the switching timing set in the above step S106. Specifically, the editing unit 144 sets the number of allocation sections as it is as the adoption number when there is no overlap in unit images and calculates the adoption number by subtracting the number of overlapping unit images from the number of allocation sections when there is overlap in unit images.

Next, the extraction unit 143 extracts unit images in step S110. For example, the extraction unit 143 extracts highlight shots and sub-shots on the basis of the image analysis result in the above step S104. Here, the extraction unit 143 extracts a unit image with a length equal to or greater than the longest allocation section from among allocation sections decided by the switching timing set in the above step S106. In addition, the extraction unit 143 calculates a total number of extracted highlight shots and sub-shots as an extraction number.

Subsequently, the operation mode controller 145 determines whether the extraction number is equal to or greater than the adoption number in step S112.

When it is determined that the extraction number is not equal to or greater than the adoption number (S112/NO), the operation mode controller 145 changes an operation mode. For example, when the operation mode before change is the normal operation mode, the operation mode controller 145 changes the normal operation mode to the segmentation processing mode. Then, the process is returned to step S106. In this manner, the operation mode controller 145 changes the operation mode and returns the process to step S106 until the extraction number becomes equal to or greater than the adoption number. When the extraction number does not become equal to or greater than the adoption number in any operation mode, the image processing apparatus 100 may outputs error and stop the process.

When it is determined that the extraction number is equal to or greater than the adoption number (S112/YES), the editing unit 144 selects unit images to be adopted in a summary image in step S116. For example, the editing unit 144 adopts unit images in which attributes for reducing visual deviation are distributed from among unit images extracted by the extraction unit 143 or select unit images such that the unit images conform to a theme designated by the user. Further, the editing unit 144 may preferentially adopt highlight shots in compared to sub-shots.

Then, the editing unit 144 sets an adoption section of each unit image in step S118. For example, the editing unit 144 sets an adoption section in each unit image selected in the above step S116 which will be adopted in the summary image. Here, the editing unit 144 sets adoption sections at appropriate positions depending on the content of unit images such that a particularly noteworthy section will be adopted in the summary image, for example. Further, the editing unit 144 stores the above-described processing result in editing information.

Then, the summary image generation unit 146 generates the summary image in step S120. For example, the summary image generation unit 146 generates the summary image by using music designated as BGM by the editing information and switching and connecting unit images designated by the editing information at a designated timing.

An example of the summary image generation process flow according to the present embodiment has been described above.

5. EXAMPLE OF HARDWARE CONFIGURATION

Figure 14:
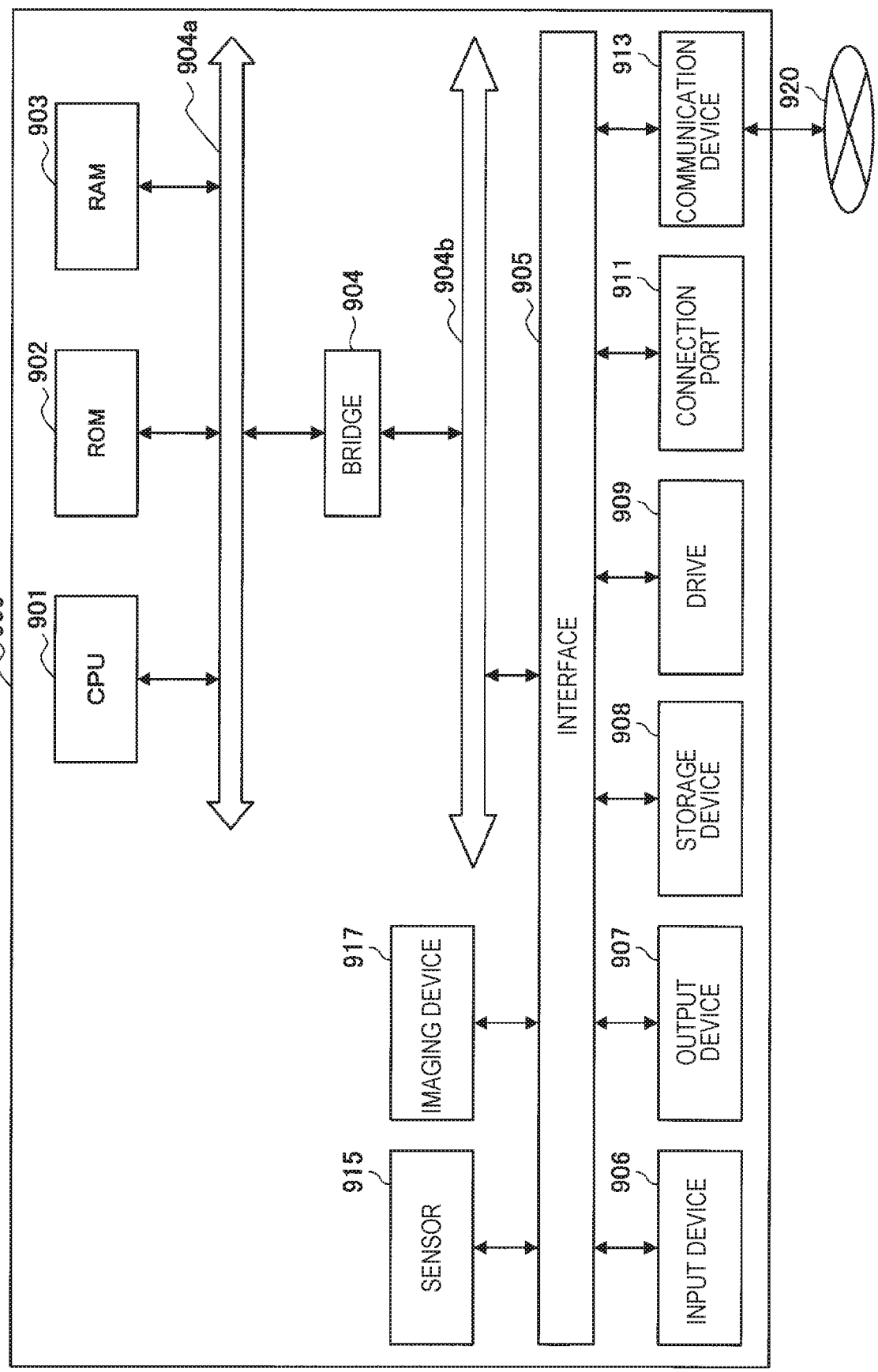
FIG. 14 is a block diagram illustrating an example of a hardware configuration of an information processing apparatus according to the present embodiment.

Finally, a hardware configuration of an information processing apparatus according to the present embodiment will be described with reference to FIG. 14. FIG. 14 is a block diagram illustrating an example of the hardware configuration of the information processing apparatus according to the present embodiment. Meanwhile, the information processing apparatus 900 illustrated in FIG. 14 may realize the image processing apparatus 100 illustrated in FIG. 4, for example. Information processing by the image processing apparatus 100 according to the present embodiment is realized according to cooperation between software and hardware described below.

As illustrated in FIG. 14, the information processing apparatus 900 includes a central processing unit (CPU) 901, a read only memory (ROM) 902, a random access memory (RAM) 903 and a host bus 904a. In addition, the information processing apparatus 900 includes a bridge 904, an external bus 904b, an interface 905, an input device 906, an output device 907, a storage device 908, a drive 909, a connection port 911, a communication device 913 and a sensor 915. The information processing apparatus 900 may include a processing circuit such as a DSP or an ASIC instead of the CPU 901 or along therewith.

The CPU 901 functions as an arithmetic processing device and a control device and controls the overall operation in the information processing apparatus 900 according to various programs. Further, the CPU 901 may be a microprocessor. The ROM 902 stores programs used by the CPU 901, operation parameters and the like. The RAM 903 temporarily stores programs used in execution of the CPU 901, parameters appropriately changed in the execution, and the like. The CPU 901 may form the controller 140 illustrated in FIG. 4, for example.

The CPU 901, the ROM 902 and the RAM 903 are connected by the host bus 904a including a CPU bus and the like. The host bus 904a is connected with the external bus 904b such as a peripheral component interconnect/interface (PCI) bus via the bridge 904. Further, the host bus 904a, the bridge 904 and the external bus 904b are not necessarily separately configured and such functions may be mounted in a single bus.

The input device 906 is realized by a device through which a user inputs information, for example, a mouse, a keyboard, a touch panel, a button, a microphone, a switch, a lever of the like. In addition, the input device 906 may be a remote control device using infrared ray or other electric waves or external connection equipment such as a cellular phone or a PDA corresponding to manipulation of the information processing apparatus 900, for example. Furthermore, the input device 906 may include an input control circuit or the like which generates an input signal on the basis of information input by the user using the aforementioned input means and outputs the input signal to the CPU 901, for example. The user of the information processing apparatus 900 may input various types of data or order a processing operation for the information processing apparatus 900 by manipulating the input device 906. The input device 906 may form the manipulation unit 112 illustrated in FIG. 4, for example.

The output device 907 is formed by a device that may visually or aurally notify the user of acquired information. As such devices, there is a display device such as a CRT display device, a liquid crystal display device, a plasma display device, an EL display device or a lamp, a sound output device such as a speaker and a headphone, a printer device and the like. The output device 907 outputs results acquired through various processes performed by the information processing apparatus 900, for example. Specifically, the display device visually displays results acquired through various processes performed by the information processing apparatus 900 in various forms such as text, images, tables and graphs. On the other hand, the sound output device converts audio signals composed of reproduced sound data, audio data and the like into analog signals and aurally outputs the analog signals. The aforementioned display device and sound output device may form the output unit 130 illustrated in FIG. 4, for example.

The storage device 908 is a device for data storage, formed as an example of a storage unit of the information processing apparatus 900. For example, the storage device 908 is realized by a magnetic storage device such as an HDD, a semiconductor storage device, an optical storage device, a magneto-optical storage device or the like. The storage device 908 may include a storage medium, a recording medium recording data on the storage medium, a reading device for reading data from the storage medium, a deletion device for deleting data recorded on the storage medium and the like. The storage device 908 stores programs and various types of data executed by the CPU 901, various types of data acquired from the outside and the like. The storage device 908 may form the storage unit 120 illustrated in FIG. 4, for example.

The drive 909 is a reader/writer for storage media and is included in or externally attached to the information processing apparatus 900. The drive 909 reads information recorded on a removable storage medium such as a magnetic disc, an optical disc, a magneto-optical disc or a semiconductor memory mounted thereon and outputs the information to the RAM 903. In addition, the drive 909 can write information on the removable storage medium.

The connection port 911 is an interface connected with external equipment and is a connector to the external equipment through which data may be transmitted through a universal serial bus (USB) and the like, for example. The connection port 911 can form the music acquisition unit 114 illustrated in FIG. 4, for example.

The communication device 913 is a communication interface formed by a communication device for connection to a network 920 or the like, for example. The communication device 913 is a communication card or the like for a wired or wireless local area network (LAN), long term evolution (LTE), Bluetooth (registered trademark) or wireless USB (WUSB), for example. In addition, the communication device 913 may be a router for optical communication, a router for asymmetric digital subscriber line (ADSL), various communication modems or the like. For example, the communication device 913 may transmit/receive signals and the like to/from the Internet and other communication apparatuses according to a predetermined protocol, for example, TCP/IP or the like. The communication device 913 may form the music acquisition unit 114 illustrated in FIG. 4, for example.

Further, the network 920 is a wired or wireless transmission path of information transmitted from devices connected to the network 920. For example, the network 920 may include a public circuit network such as the Internet, a telephone circuit network or a satellite communication network, various local area networks (LANs) including Ethernet (registered trademark), a wide area network (WAN) and the like. In addition, the network 920 may include a dedicated circuit network such as an internet protocol-virtual private network (IP-VPN).

The sensor 915 is various sensors such as an acceleration sensor, a gyro sensor, a geomagnetic sensor, an optical sensor, a sound sensor, a ranging sensor and a force sensor. The sensor 915 acquires information about the state of the information processing apparatus 900 such as the posture and moving speed of the information processing apparatus 900 and information about a surrounding environment of the information processing apparatus 900 such as surrounding brightness and noise of the information processing apparatus 900. In addition, the sensor 915 may include a GPS sensor for receiving a GPS signal and measuring the latitude, longitude and altitude of the apparatus. The sensor 915 can form the sensor unit 111 illustrated in FIG. 4, for example. In the present embodiment, the sensor 915 may be separated from the information processing apparatus 900. For example, the sensor 915 may be attached to a subject and the information processing apparatus 900 may acquire information indicating a subject sensing result through wired or wireless communication.

An imaging device 917 includes a lens system composed of an imaging lens, an iris, a zoom lens, a focus lens and the like, a driving system for causing the lens system to perform a focus operation and a zoom operation, a solid-state imaging sensor array for photo-electrically converting imaging light acquired through the lens system to generate an imaging signal, and the like. The solid-state imaging sensor array may be realized by a charge coupled device (CCD) sensor array or a complementary metal oxide semiconductor (CMOS) sensor array, for example. The imaging device 917 outputs data of captured images in the form of digital signals. The imaging device 917 may form the image acquisition unit 113 illustrated in FIG. 4, for example.

Hereinbefore, an example of a hardware configuration capable of realizing the functions of the information processing apparatus 900 according to this embodiment is shown. The respective components may be implemented using universal members, or may be implemented by hardware specific to the functions of the respective components. Accordingly, according to a technical level at the time when the embodiments are executed, it is possible to appropriately change hardware configurations to be used.

In addition, a computer program for realizing each of the functions of the information processing apparatus 900 according to the present embodiment may be created, and may be mounted in a PC or the like. Furthermore, a computer-readable recording medium on which such a computer program is stored may be provided. The recording medium is a magnetic disc, an optical disc, a magneto-optical disc, a flash memory, or the like, for example. The computer program may be delivered through a network, for example, without using the recording medium.

6. CONCLUSION

An embodiment of the present disclosure has been described in detail with reference to FIGS. 1 to 14. As described above, the image processing apparatus 100 according to the present embodiment can generate a summary image that can excite the emotion of a viewer by switching appropriate unit images at an appropriate timing to music.

More specifically, the image processing apparatus 100 analyzes beats of input music, extracts a plurality of unit images from an input image and generates editing information for switching the extracted unit images depending on the beats. Accordingly, unit images are switched at a fast timing depending on beats and thus the emotion of the viewer can be excited more effectively.

In addition, the image processing apparatus 100 sets adoption sections depending on the content of extracted unit images in the extracted unit images and generates editing information for adopting adoption sections set for a plurality of unit images. Accordingly, the image processing apparatus 100 can set a section to be actually adopted in the summary image in a particularly noteworthy section in each extracted section for each section extracted as a candidate to be adopted in the summary image. Accordingly, more appropriate sections for exciting the emotion of the viewer, for example, are adopted in the summary image.

Furthermore, the image processing apparatus 100 controls operation modes related to a process of extracting unit images from an input image and a process of setting a unit image switching timing depending on input music. Accordingly, the image processing apparatus 100 can generate a summary image that switches images depending on music in an appropriate operation mode. Specifically, the image processing apparatus 100 can switch different unit images at a set switching timing by switching operation modes such that the adoption number becomes equal to or greater than the extraction number or the extraction number becomes greater than the adoption number.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Meanwhile, devices described in the specification may be realized as independents devices or part of or all devices may be realized as separate devices. For example, in the example of the functional configuration of the image processing apparatus 100 illustrated in FIG. 4, the storage unit 120 and the controller 140 may be included in a device such as a server connected to the input unit 110 and the output unit 130 through a network or the like.

Note that it is not necessary for the processing described in this specification with reference to the flowchart to be executed in the order shown in the flowchart. Some processing steps may be performed in parallel. Further, some of additional steps can be adopted, or some processing steps can be omitted.

Further, the effects described in this specification are merely illustrative or exemplified effects, and are not limitative. That is, with or in the place of the above effects, the technology according to the present disclosure may achieve other effects that are clear to those skilled in the art based on the description of this specification.

Additionally, the present technology may also be configured as below.

(1)

An image processing method including:
analyzing content of an input image;
extracting a plurality of unit images from the image on the basis of a result of analysis of the image; and
setting adoption sections depending on content of the unit images in the extracted unit images and generating editing information for adopting the adoption sections set for the plurality of unit images through a processor.

(2)

The image processing method according to (1), wherein, in the generating of the editing information, positions of the adoption sections in the unit images are set depending on the content of the unit images.

(3)

The image processing method according to (2), wherein, in the generating of the editing information, the positions of the adoption sections in the unit images are set depending on a motion of a subject of the image indicated by the result of analysis of the image.

(4)

The image processing method according to (3), wherein, in the generating of the editing information, with respect to the unit images in which the motion of the subject of the image is analyzed as a jump, the adoption sections are set at any of positions during approaching, from approaching to a stay in air, during the stay in air, from the stay in air to a post-landing, and from a landing to the post-landing.

(5)

The image processing method according to (3) or (4), wherein, in the generating of the editing information, with respect to the unit images in which the motion of the subject of the image is analyzed as a turn of a moving direction, the adoption sections are set at any of positions from a before-turn to turning, during turning, and from turning to an after-turn.

(6)

The image processing method according to any one of (1) to (5), wherein, in the extracting of the unit images, attention levels of the unit images are set on the basis of the result of analysis of the image.

(7)

The image processing method according to (6), wherein, in the generating of the editing information, when the adoption sections are set for two or more unit images of the same type having high attention levels, the positions of the adoption sections are distributed in the two or more unit images.

(8)

The image processing method according to (6) or (7), wherein, in the generating of the editing information, the adoption sections of the unit images having high attention levels are connected with adoption sections of unit images of a different type having high attention levels or adoption sections of unit images having low attention levels.

(9)

The image processing method according to any one of (6) to (8), wherein, in the generating of the editing information, the lengths of the adoption sections of the unit images having high attention levels are set to be greater than the lengths of the adoption sections of the unit images having low attention levels.

(10)

The image processing method according to any one of (6) to (9), wherein, in the extracting of the unit images, when a motion of a subject in image-capturing sections of the unit images is analyzed as a predetermined motion, high attention levels are set for the unit images when a state of the subject is analyzed as a predetermined state or there has been a predetermined manipulation and low attention levels are set in other cases.

(11)

An image processing apparatus including:

an image analysis unit configured to analyze content of an input image;

an extraction unit configured to extract a plurality of unit images from the image on the basis of an analysis result by the image analysis unit; and an editing unit configured to set adoption sections depending on content of the unit images in the extracted unit images extracted by the extraction unit and generate editing information for adopting the adoption sections set for the plurality of unit images.

(12)

The image processing apparatus according to (11), wherein the editing unit sets positions of the adoption sections in the unit images depending on the content of the unit images.

(13)

The image processing apparatus according to (12), wherein the editing unit sets the positions of the adoption sections in the unit images depending on a motion of a subject of the image analyzed by the image analysis unit.

(14)

The image processing apparatus according to (13), wherein, with respect to the unit images in which the motion of the subject is analyzed as a jump by the image analysis unit, the editing unit sets the adoption sections at any of a position during approaching, from approaching to a stay in air, during the stay in air, from the stay in air to a post-landing, and from a landing to the post-landing.

(15)

A program for causing a computer to function as:

an image analysis unit that analyzes content of an input image;

an extraction unit that extracts a plurality of unit images from the image on the basis of an analysis result by the image analysis unit; and an editing unit that sets adoption sections depending on content of the unit images in the extracted unit images extracted by the extraction unit and generates editing information for adopting the adoption sections set for the plurality of unit images.

Furthermore, the present technology may also be configured as below.

(1)

An image processing method including:

extracting a plurality of unit images from an input image;

generating editing information for switching the unit images adopted among the extracted unit images depending on input music; and controlling, by a processor, an operation mode in an extraction process for extracting the unit images and an adoption process for adopting the unit images.

(2)

The image processing method according to (1), wherein, in the controlling of the operation mode, whether to change the operation mode and perform at least one of a re-extraction process and a re-adoption process is determined depending on a size relation between an extraction number of the extracted unit images and an adoption number of the adopted unit images in a first operation mode.

(3)

The image processing method according to (2), further including:

analyzing the content of the music; and analyzing the content of the image, wherein the extraction number is the number of unit images extracted on the basis of a result of analysis of the image, and the adoption number is the number of divisions of the music on the basis of a result of analysis of the music.

(4)

The image processing method according to (3), wherein, in the controlling of the operation mode, it is determined that the operation mode is not changed when the adoption number is equal to the extraction number or the extraction number is greater than the adoption number in the first operation mode.

(5)

The image processing method according to (4), wherein, in the controlling of the operation mode, the operation mode is set to a second operation mode when the extraction number is less than the adoption number in the first operation mode, and in the extraction process in the second operation mode, at least one of the unit images extracted in the first operation mode is divided into two or more unit images.

(6)

The image processing method according to (4) or (5), wherein the unit images are extracted at lengths equal to or greater than a longest section obtained by dividing the music in the extraction process.

(7)

The image processing method according to (6), wherein, in the controlling of the operation mode, the operation mode is set to a third operation mode when the extraction number in the first operation mode is less than the adoption number, and in the use process in the third operation mode, the longest section obtained by dividing the music is set to be shorter than that in the first operation mode.

(8)

The image processing method according to any one of (4) to (7), wherein, in the controlling of the operation mode, the operation mode is set to a fourth operation mode when the extraction number in the first operation mode is less than the adoption number, and in the extraction process in the fourth operation mode, a condition related to the image analysis result for extracting the unit images is mitigated in comparison to the first operation mode.

(9)

The image processing method according to any one of (4) to (8), wherein, in the controlling of the operation mode, the operation mode is set to a fifth operation mode when the extraction number in the first operation mode is less than the adoption number, the music is divided at predetermined intervals in the use process in the fifth operation mode, and the unit images obtained by dividing the image at the predetermined intervals are extracted in the extraction process in the fifth operation mode.

(10)

An image processing apparatus including:

an extraction unit configured to extract a plurality of unit images from an input image;

an editing unit configured to generate editing information for switching the unit images adopted among the unit images extracted by the extraction unit depending on input music; and an operation mode controller that controls an operation mode in the extraction unit and the editing unit.

(11)
The image processing apparatus according to (10), wherein the operation mode controller determines whether to change the operation mode and perform at least one of a re-extraction process by the extraction unit and a re-adoption process by the editing unit depending on a size relation between an extraction number of the unit images extracted by the extraction unit and an adoption number of the unit images adopted by the editing unit in a first operation mode.

(12)
The image processing apparatus according to (11), further including:
a music analysis unit configured to analyze the content of the music; and
an image analysis unit configured to analyze the content of the image,
wherein the extraction number is the number of unit images extracted by the extraction unit on the basis of an analysis result by the image analysis unit, and
the adoption number is the number of divisions of the music by the editing unit on the basis of an analysis result by the music analysis unit.

(13)
The image processing apparatus according to (12), wherein the operation mode controller determines that the operation mode is not changed when the adoption number is equal to the extraction number or the extraction number is greater than the adoption number in the first operation mode.

(14)
A program for causing a computer to function as:
an extraction unit configured to extract a plurality of unit images from an input image;
an editing unit configured to generate editing information for switching the unit images adopted among the unit images extracted by the extraction unit depending on input music; and
an operation mode controller configured to control an operation mode in the extraction unit and the editing unit.

(1)
An information processing method including:
analyzing content of an input image; and
setting a position of an adoption section that is adopted from the image on the basis of information on a section of music and scene information of the analyzed image.

(2)
The information processing method according to (1), including:
generating editing information for setting the adoption section.

(3)
The information processing method according to (1) or (2), including: setting the position of the adoption section in the image depending on a motion of a subject of the image indicated by a result of analysis of the image.

(4)
The information processing method according to (3), including:
setting the adoption section at any of positions during approaching, from approaching to a stay in air, during the stay in air, from the stay in air to a post-landing, and from a landing to the post-landing with respect to the image in which the motion of the subject of the image is analyzed as a jump.

(5)
The information processing method according to (4), including:
setting the adoption section at any of positions from a before-turn to turning, during turning, and from turning to an after-turn with respect to the image in which the motion of the subject of the image is analyzed as a turn of a moving direction.

(6)
The information processing method according to (1), including:
setting a second adoption section corresponding to a second music section immediately after a first music section corresponding to a first adoption section.

(7)
The information processing method according to (1), including:
generating the information on the section of the music on the basis of a component of the music.

(8)
The information processing method according to (1) or (7), wherein the section of the music includes at least a measure section and a beat section.

(9)
The information processing method according to (1), including: associating an attention level set through analysis of the image with the adoption section.

(10)
The information processing method according to (1) or (9), including:
distributing, when a plurality of the adoption sections are connected, positions of the adoption sections having the scene information of the same type.

(11)
The information processing method according to (9), including:
connecting the adoption section associated with a high attention level with the adoption section of a different type associated with a high attention level or the adoption section associated with a low attention level.

(12)
The information processing method according to (9) or (11), including:
setting the length of the adoption section associated with a high attention level to be greater than the length of the adoption section associated with a low attention level.

(13)
The information processing method according to (1) or (3) to (5), including; setting a high attention level for the image when a motion of a subject in the image is analyzed as a predetermined motion or state or presence of a predetermined manipulation is analyzed.

(14)
The information processing method according to (1) or (9), including:
extracting a unit image from the image and setting the position of the adoption section that is adopted from the unit image; and
setting an attention level of the unit image on the basis of a result of analysis of the image.

(15)
An image processing apparatus including:
an image analysis unit configured to analyze content of an input image; and
an extraction unit configured to set a position of an adoption section that is adopted from the image on the basis of information on a section of music and scene information of the analyzed image.

(16)
A program for causing a computer to function as:
an image analysis unit configured to analyze content of an input image; and an extraction unit configured to set a position of an adoption section that is adopted from the image on the basis of information on a section of music and scene information of the analyzed image.

REFERENCE SIGNS LIST 10 image
20 image analysis result information
30 music
40 editing information
50 summary image
100 image processing apparatus
110 input unit
111 sensor unit
112 manipulation unit
113 image acquisition unit
114 music acquisition unit
120 storage unit
130 output unit
140 controller
141 music analysis unit
142 image analysis unit
143 extraction unit
144 editing unit
145 operation mode controller
146 summary image generation unit

The invention claimed is:

1. An information processing method, comprising:
in an image processing apparatus which includes one or more processors:
receiving a set of user inputs for a set of input images of a plurality of input images, wherein each of the set of user inputs is received at a corresponding time of capture of each of the set of input images;
setting a plurality of first attention levels for the plurality of input images based on the received set of user inputs;
setting a plurality of second attention levels for the plurality of input images based on content of the plurality of input images;
extracting a plurality of unit images from the plurality of input images based on the set plurality of first attention levels and the set plurality of second attention levels;
selecting a set of unit images from the extracted plurality of unit images based on a specific criteria, wherein the specific criteria is one of a user designated theme or visual deviation attributes associated with the extracted plurality of unit images;
connecting a first unit image of the selected set of unit images with a second unit image of the selected set of unit images, wherein
the first unit image is associated with a third attention level of the plurality of second attention levels,
the second unit image is associated with one of the third attention level or a fourth attention level of the plurality of second attention levels, and
the fourth attention level is lower than the third attention level;
generating a summary image based on the connected first unit image and the second unit image;
dividing input music content into a plurality of sections; and
setting a position of each of the first unit image and the second unit image in the generated summary image, wherein the position of each of the first unit image and the second unit image is set based on a timing of the divided plurality of sections of the input music content.

2. The information processing method according to claim 1, further comprising:
generating editing information; and
setting the position of each of the first unit image and the second unit image as adoption section based on the editing information.

3. The information processing method according to claim 1, further comprising extracting the plurality of unit images based on a motion of a subject in the content of the plurality of input images.

4. The information processing method according to claim 3, wherein the motion indicates a jump.

5. The information processing method according to claim 3, wherein the motion indicates a turn in a moving direction of the subject.

6. The information processing method according to claim 1, further comprising dividing the input music content into the plurality of sections based on a component of the input music content.

7. The information processing method according to claim 1, wherein the plurality of sections of the input music content includes at least one of a measure section or a beat section.

8. The information processing method according to claim 1, further comprising:
determining a highlight type for the plurality of input images based on analysis of the content of the plurality of input images; and
setting a position of each of the extracted plurality of unit images as adoption section based on the determined highlight type.

9. The information processing method according to claim 1, further comprising:
allocating a first display time duration to the first unit image of the selected set of unit images; and
allocating a second display time duration to the second unit image of the selected set of unit images, wherein the second display time duration is smaller than the first display time duration.

10. The information processing method according to claim 1, further comprising setting the plurality of first attention levels for the plurality of input images based on detection of a motion of a subject in the plurality of input images.

11. An image processing apparatus, comprising:
one or more processors configured to:
receive a set of user inputs for a set of input images of a plurality of input images, wherein each of the set of user inputs is received at a corresponding time of capture of each of the set of input images;
set a plurality of first attention levels for the plurality of input images based on the received set of user inputs;
set a plurality of second attention levels for the plurality of input images based on content of the plurality of input images;
extract a plurality of unit images from the plurality of input images based on the set plurality of first attention levels and the set plurality of second attention levels;
select a set of unit images from the extracted plurality of unit images based on a specific criteria, wherein the specific criteria is one of a user designated theme or visual deviation attributes associated with the extracted plurality of unit images;

connect a first unit image of the selected set of unit images with a second unit image of the selected set of unit images, wherein
the first unit image is associated with a third attention level of the plurality of second attention levels,
the second unit image is associated with one of the third attention level or a fourth attention level of the plurality of second attention levels, and
the fourth attention level is lower than the third attention level;
generate a summary image based on the connected first unit image and the second unit image;
divide input music content into a plurality of sections; and
set a position of each of the first unit image and the second unit image in the generated summary image, wherein the position of each of the first unit image and the second unit image is set based on a timing of the divided plurality of sections of the input music content.

12. A non-transitory computer-readable medium having stored thereon, computer-executable instructions which, when executed by at least one processor, cause the at least one processor to execute operations, the operations comprising:
receiving a set of user inputs for a set of input images of a plurality of input images, wherein each of the set of user inputs is received at a corresponding time of capture of each of the set of input images;
setting a plurality of first attention levels for the plurality of input images based on the received set of user inputs;
setting a plurality of second attention levels for the plurality of input images based on content of the plurality of input images;
extracting a plurality of unit images from the plurality of input images based on the set plurality of first attention levels and the set plurality of second attention levels;
selecting a set of unit images from the extracted plurality of unit images based on a specific criteria, wherein the specific criteria is one of a user designated theme or visual deviation attributes associated with the extracted plurality of unit images;
connecting a first unit image of the selected set of unit images with a second unit image of the selected set of unit images, wherein
the first unit image is associated with a third attention level of the plurality of second attention levels,
the second unit image is associated with one of the third attention level or a fourth attention level of the plurality of second attention levels, and
the fourth attention level is lower than the third attention level;
generating a summary image based on the connected first unit image and the second unit image;
dividing input music content into a plurality of sections; and
setting a position of each of the first unit image and the second unit image in the generated summary image, wherein the position of each of the first unit image and the second unit image is set based on a timing of the divided plurality of sections of the input music content.

13. The information processing method according to claim 1, wherein the summary image comprises the input music content as a background music (BGM).

14. The information processing method according to claim 1, wherein the user designated theme is one of a surfing activity or a snowboarding activity.

15. The information processing method according to claim 1, further comprising switching each of the first unit image and the second unit image in the generated summary image based on a count of beats of the input music content, wherein the count is greater than a threshold count.

16. The information processing method according to claim 1, wherein
the set of user inputs includes at least one of a zooming operation or selection of an image capturing mode,
the zooming operation is associated with the plurality of input images, and
the image capturing mode is associated with the image processing apparatus.

* * * * *